US012288423B2

(12) United States Patent
Schwartz et al.

(10) Patent No.: US 12,288,423 B2
(45) Date of Patent: Apr. 29, 2025

(54) QUEUE MANAGEMENT SYSTEM AND METHOD

(71) Applicant: Universal City Studios LLC, Universal City, CA (US)

(72) Inventors: Justin Michael Schwartz, Orlando, FL (US); Ross Alan Osterman, Winter Park, FL (US); Jeffrey Lamar Polk, Winter Garden, FL (US)

(73) Assignee: Universal City Studios LLC, Universal City, CA (US)

(*) Notice: Subject to any disclaimer, the term of this patent is extended or adjusted under 35 U.S.C. 154(b) by 0 days.

(21) Appl. No.: 17/315,522

(22) Filed: May 10, 2021

(65) Prior Publication Data

US 2021/0264710 A1 Aug. 26, 2021

Related U.S. Application Data

(63) Continuation of application No. 16/417,287, filed on May 20, 2019, now Pat. No. 11,004,290, which is a (Continued)

(51) Int. Cl.
*G07C 11/00* (2006.01)

(52) U.S. Cl.
CPC .......... *G07C 11/00* (2013.01); *G07C 2011/02* (2013.01); *G07C 2011/04* (2013.01)

(58) Field of Classification Search
CPC . G07C 11/00; G07C 2011/02; G07C 2011/04; G06Q 10/025; G06Q 10/02;

(Continued)

(56) References Cited

U.S. PATENT DOCUMENTS 5,502,806 A 3/1996 Mahoney et al.
5,566,327 A 10/1996 Sehr (Continued)

FOREIGN PATENT DOCUMENTS

CN 101498586 8/2009
CN 101833698 9/2010

(Continued)

OTHER PUBLICATIONS

H. Yu, X. Li, S. Zhang and Y. Shi, "An Adaptive Approach to Resource Provisioning in PaaS," 2011 Eighth Web Information Systems and Applications Conference, Chongqing, China, 2011, pp. 52-57 (Year: 2011).*

(Continued)

*Primary Examiner* — Messeret F Gebre
(74) *Attorney, Agent, or Firm* — Fletcher Yoder, P.C.

(57) ABSTRACT

A queue management system in accordance with present embodiments may include a data server system including a processor and memory. The queue management system may include an interface system of the data server system configured to receive a reservation request including an indication of a general time period of arrival of a guest to an area. Additionally, the queue management system may include a reservation right allotment system of the data server system configured to correlate a reservation slot for accessing an attraction to identification information for the guest. Further, the queue management system may include a detection system of the data server system configured to determine when a portable identification feature associated with the identification information has arrived to the area, and a reservation assignment system of the data server system configured to establish a reservation to access the attraction at a specific time window.

20 Claims, 7 Drawing Sheets

Related U.S. Application Data continuation of application No. 13/491,289, filed on Jun. 7, 2012, now Pat. No. 10,304,276.

(58) Field of Classification Search
CPC ....... H04W 4/029; H04W 4/02; H04W 4/024; H04W 4/027; G07B 11/00; A63G 31/00; A63G 7/00; A63G 31/16; A63G 31/007; A63G 21/18
See application file for complete search history.

(56) References Cited

U.S. PATENT DOCUMENTS 5,978,770 A 11/1999 Waytena et al.
5,987,421 A 11/1999 Chuang
6,078,928 A 6/2000 Schnase et al.
6,142,368 A 11/2000 Mullins et al.
6,173,209 B1 1/2001 Laval et al.
6,259,786 B1 7/2001 Gisby et al.
6,424,623 B1 7/2002 Borgstahl et al.
6,526,158 B1 2/2003 Goldberg
6,529,786 B1 * 3/2003 Sim .................... G06Q 10/025 705/5
6,629,019 B2 9/2003 Legge et al.
6,748,364 B1 6/2004 Waytena et al.
6,785,539 B2 8/2004 Hale et al.
6,813,608 B1 11/2004 Baranowski
6,819,759 B1 11/2004 Khuc et al.
6,845,361 B1 1/2005 Dowling
6,873,260 B2 3/2005 Lancos et al.
6,889,098 B1 5/2005 Laval et al.
6,889,900 B2 * 5/2005 Davies .................. G07C 11/00 235/385
6,937,998 B1 8/2005 Swarta et al.
7,047,205 B2 5/2006 Hale et al.
7,136,822 B2 11/2006 Kimura et al.
7,212,983 B2 5/2007 Redmann et al.
7,222,080 B2 5/2007 Hale et al.
7,366,512 B1 4/2008 Kafalas et al.
7,400,932 B2 7/2008 Ackley et al.
7,430,411 B2 9/2008 Sengupta et al.
7,496,445 B2 2/2009 Mohsini et al.
7,505,474 B2 3/2009 Walter
7,516,148 B2 4/2009 Waytena et al.
7,532,941 B2 5/2009 Hale et al.
7,541,926 B2 6/2009 Dugan et al.
7,603,321 B2 10/2009 Gurvey
7,685,009 B2 3/2010 Halavais et al.
7,685,014 B2 3/2010 Dean
7,706,904 B2 4/2010 Jones et al.
7,720,718 B2 5/2010 Hale et al.
7,729,382 B2 6/2010 Rosner et al.
7,752,146 B2 7/2010 Lert
7,756,745 B2 7/2010 Leet et al.
7,778,937 B2 8/2010 Ferrara et al.
7,787,965 B2 8/2010 Hale et al.
7,788,215 B2 8/2010 Trowbridge et al.
7,801,629 B2 9/2010 Hale et al.
7,801,752 B2 9/2010 Neulight
7,817,990 B2 10/2010 Pamminger et al.
7,826,966 B2 11/2010 Little et al.
7,837,567 B2 11/2010 Holzberg et al.
7,895,066 B2 2/2011 Waytena et al.
7,942,320 B2 5/2011 Joe
7,966,215 B1 6/2011 Meyers et al.
8,082,165 B2 12/2011 Natsuyama et al.
8,126,782 B1 2/2012 Zhu et al.
8,200,515 B2 6/2012 Natsuyama et al.
8,253,533 B2 8/2012 Jones
8,275,767 B2 9/2012 Shepherd et al.
8,294,549 B2 10/2012 Samovar et al.
8,330,587 B2 12/2012 Kupstas et al.
8,396,001 B2 3/2013 Jung et al.
8,396,727 B2 3/2013 Waytena et al.
8,416,087 B2 4/2013 Canora et al.
8,452,708 B1 5/2013 Birenbaum et al.
8,462,994 B2 6/2013 Ortiz et al.
8,489,657 B2 7/2013 Shepherd et al.
8,498,900 B1 7/2013 Spirin et al.
8,510,163 B2 8/2013 Hess et al.
8,565,735 B2 10/2013 Wohlwend
8,577,734 B2 11/2013 Treyz et al.
8,612,278 B1 12/2013 Ashley et al.
8,616,984 B2 12/2013 Mattice et al.
8,618,935 B2 12/2013 Felt et al.
8,654,965 B2 2/2014 Dube et al.
8,700,005 B1 4/2014 Kiraly et al.
8,731,997 B2 5/2014 Corbett et al.
8,750,576 B2 6/2014 Huang et al.
8,775,244 B2 7/2014 Boss et al.
8,793,314 B2 7/2014 Spivak et al.
8,798,643 B1 8/2014 Boyle et al.
8,830,030 B2 9/2014 Arthurs et al.
8,831,963 B2 9/2014 Backer et al.
8,879,440 B2 11/2014 Guo et al.
8,896,485 B2 11/2014 Mendelson
8,897,808 B2 11/2014 Farris
8,924,432 B2 12/2014 Richards et al.
8,948,541 B2 2/2015 Neville et al.
8,949,146 B2 2/2015 Fisher
8,954,091 B1 2/2015 Boyle et al.
8,972,048 B2 3/2015 Canora et al.
9,002,736 B2 4/2015 Wohlwend et al.
2002/0007292 A1 1/2002 Paxton et al.
2002/0046068 A1 4/2002 Koh
2002/0070865 A1 6/2002 Lancos et al.
2002/0082897 A1 6/2002 Menelly et al.
2002/0099576 A1 7/2002 Macdonald et al.
2002/0116233 A1 8/2002 Kuge
2002/0116235 A1 8/2002 Grimm et al.
2002/0174003 A1 * 11/2002 Redmann ............. G08G 1/0962 705/5
2003/0041105 A1 2/2003 Patrick
2003/0093167 A1 5/2003 Sim
2003/0102956 A1 * 6/2003 McManus .............. G07C 11/00 340/5.2
2003/0120801 A1 * 6/2003 Keever ............... H04L 63/0272 709/237
2003/0195760 A1 10/2003 Kim et al.
2004/0006497 A1 1/2004 Nestor et al.
2004/0059614 A1 3/2004 Brown et al.
2004/0100390 A1 5/2004 Giraldin et al.
2004/0117219 A1 6/2004 Sugimoto et al.
2004/0117528 A1 6/2004 Beacher et al.
2004/0225540 A1 11/2004 Waytena et al.
2005/0045710 A1 3/2005 Burke
2005/0070258 A1 3/2005 Stanco
2005/0080675 A1 4/2005 Lovegreen et al.
2005/0198107 A1 9/2005 Cuhls et al.
2005/0200455 A1 9/2005 Veni et al.
2005/0240453 A1 10/2005 Lyons
2006/0002413 A1 1/2006 Tsutazawa et al.
2006/0068787 A1 3/2006 Deshpande et al.
2006/0147005 A1 7/2006 Taub
2006/0273920 A1 12/2006 Doan et al.
2007/0042748 A1 2/2007 MacArthur
2007/0064904 A1 3/2007 Wesley
2007/0088701 A1 4/2007 Rao
2007/0130313 A1 6/2007 King
2007/0156846 A1 7/2007 Seward et al.
2007/0168390 A1 7/2007 Mardirossian
2007/0174042 A1 7/2007 Thompson
2007/0203763 A1 8/2007 Ackley et al.
2007/0225911 A1 9/2007 Chanick et al.
2007/0233291 A1 10/2007 Herde et al.
2007/0244731 A1 10/2007 Barhydt et al.
2007/0286220 A1 12/2007 Stenning
2008/0022089 A1 1/2008 Leedom
2008/0040172 A1 2/2008 Watkins
2008/0055051 A1 3/2008 Snyder et al.
2008/0071587 A1 3/2008 Granucci et al.
2008/0080445 A1 4/2008 Bayne et al.
2008/0086377 A1 4/2008 Jain
2008/0133283 A1 6/2008 Backer et al.

(56) References Cited

U.S. PATENT DOCUMENTS

2008/0201227 A1 8/2008 Bakewell et al.
2008/0215385 A1 9/2008 Veitch et al.
2008/0267107 A1 10/2008 Rosenberg
2008/0270230 A1 10/2008 Hendrickson et al.
2008/0270305 A1 10/2008 Andreasson et al.
2008/0275630 A1 11/2008 Regienczuk
2008/0301264 A1 12/2008 Mathal et al.
2008/0319935 A1 12/2008 Chandak
2008/0319992 A1 12/2008 Mathal et al.
2009/0063205 A1 3/2009 Shibasaki
2009/0104874 A1 4/2009 Ellis
2009/0112638 A1 4/2009 Kneller et al.
2009/0204449 A1 * 8/2009 Waytena .............. G06Q 10/087 705/5
2009/0216547 A1 8/2009 Canora et al.
2009/0222291 A1 9/2009 Montavon et al.
2009/0259556 A1 10/2009 Carroll et al.
2009/0267728 A1 10/2009 Mayrand
2009/0281903 A1 11/2009 Blatstein
2009/0286559 A1 11/2009 Janas et al.
2009/0313062 A1 12/2009 Natsuyama et al.
2009/0319306 A1 12/2009 Chanick
2010/0017238 A1 1/2010 Johnson et al.
2010/0017725 A1 1/2010 McCarthy et al.
2010/0062838 A1 3/2010 Nguyen et al.
2010/0063854 A1 3/2010 Purvis et al.
2010/0111377 A1 5/2010 Monroe
2010/0114968 A1 5/2010 Dean
2010/0161432 A1 6/2010 Kumanov et al.
2010/0262507 A1 10/2010 Woycik et al.
2010/0308964 A1 12/2010 Ackley et al.
2010/0317377 A1 12/2010 Zou et al.
2010/0321149 A1 12/2010 Foster
2010/0328025 A1 12/2010 Razdan
2011/0022425 A1 1/2011 Block et al.
2011/0040655 A1 2/2011 Hendrickson et al.
2011/0178960 A1 7/2011 Dever et al.
2011/0227726 A1 9/2011 Lee et al.
2011/0307547 A1 12/2011 Backer et al.
2012/0016745 A1 1/2012 Hendrickson et al.
2012/0040751 A1 2/2012 Peters
2012/0116789 A1 5/2012 Boss et al.
2012/0116863 A1 5/2012 Boss et al.
2012/0147169 A1 6/2012 Harper et al.
2012/0197746 A1 8/2012 Harris
2012/0197949 A1 8/2012 Taylor et al.
2012/0271834 A1 10/2012 Canora et al.
2012/0287281 A1 11/2012 Williams et al.
2012/0323646 A1 12/2012 Dube et al.
2013/0018661 A1 1/2013 Padgett et al.
2013/0018684 A1 1/2013 Padgett et al.
2013/0041696 A1 2/2013 Richard
2013/0045804 A1 2/2013 Ruke
2013/0066660 A1 3/2013 Kopitzke et al.
2013/0073325 A1 3/2013 Ross
2013/0090957 A1 4/2013 Popkey et al.
2013/0091146 A1 4/2013 Stanger et al.
2013/0102248 A1 4/2013 Jay et al.
2013/0103519 A1 4/2013 Kountotsis et al.
2013/0124234 A1 5/2013 Nilsson et al.
2013/0151296 A1 6/2013 Waytena et al.
2013/0165154 A1 6/2013 Joshi
2013/0204651 A1 8/2013 Gulec et al.
2013/0204656 A1 8/2013 Mahfouda et al.
2013/0254027 A1 9/2013 Silverman et al.
2013/0293720 A1 11/2013 Tyson et al.
2013/0332208 A1 12/2013 Mehta
2013/0332509 A1 12/2013 Schwartz et al.
2014/0006451 A1 1/2014 Mullis et al.
2014/0046802 A1 2/2014 Hosein et al.
2014/0074404 A1 3/2014 Hassan
2014/0074523 A1 3/2014 Turner et al.
2014/0089075 A1 3/2014 Sanchis et al.
2014/0108149 A1 4/2014 Jabara et al.
2014/0132400 A1 5/2014 Heaven et al.
2014/0136105 A1 5/2014 Chakraborty et al.
2014/0156290 A1 6/2014 Kozicki et al.
2014/0156319 A1 6/2014 Deeb
2014/0162693 A1 6/2014 Wachter et al.
2014/0235276 A1 8/2014 Lefkowitz
2014/0236653 A1 8/2014 Farrell
2014/0249866 A1 9/2014 Popkey et al.
2014/0257889 A1 9/2014 Ashley et al.
2014/0324488 A1 10/2014 Boccelli
2014/0343976 A1 11/2014 Ahluwalia et al.
2014/0343977 A1 11/2014 Macina
2014/0343995 A1 11/2014 Backer et al.
2014/0364148 A1 12/2014 Block et al.
2014/0378233 A1 12/2014 Weston et al.
2015/0025919 A1 1/2015 West
2015/0026008 A1 1/2015 Werbitt
2015/0058324 A1 2/2015 Kauwe
2015/0080081 A1 3/2015 Kessman et al.
2015/0081348 A1 3/2015 Vera et al.
2015/0083803 A1 3/2015 Herron et al.
2015/0088562 A1 3/2015 Woods
2015/0088671 A1 3/2015 Xiong et al.
2015/0088782 A1 3/2015 Zhang
2017/0032288 A1 2/2017 Popkey et al.

FOREIGN PATENT DOCUMENTS

CN 201607767 10/2010
EP 0958553 11/1999
EP 1690222 8/2006
EP 1696327 8/2006
JP 2002032800 1/2002
JP 2003288515 A * 10/2003
JP 2004102437 A 4/2004
JP 2004110754 A * 4/2004
JP 2004178041 6/2004
JP 2004295685 10/2004
JP 2005141652 A * 6/2005
JP 2006-134260 5/2006
JP 2007025817 A 2/2007
JP 2009146105 A * 7/2009
KR 20020077628 10/2002
KR 20080012363 A 2/2008
WO 2003034350 4/2003
WO 2004047353 6/2004
WO 2005038688 4/2005
WO 2005124699 12/2005
WO 2008128583 10/2008
WO 2008144283 11/2008
WO 2010089771 8/2010

OTHER PUBLICATIONS

Kahraman, A., & Gosavi, A. (2011). On the distribution of the No. stranded in bulk-arrival, bulk-service queues of the M/G/1 form. European Journal of Operational Research, 212(2), 352-60. (Year: 2011).*

Y. Ohtani, S. Sawada and S. Nogami, “Study on congestion reducing in the theme park,” 8th Asia-Pacific Symposium on Information and Telecommunication Technologies, Kuching, Malaysia, 2010, pp. 1-6. (Year: 2010).*

J. Borrell, S. Robles, J. Serra and A. Riera, “Securing the itinerary of mobile agents through a non-repudiation protocol,” Proceedings IEEE 33rd Annual 1999 International Carnahan Conference on Security Technology (Cat. No. 99CH36303), Madrid, Spain, 1999, pp. 461-464.

A. A. Niknafs, M. E. Shiri and M. M. Javidi, “A case-based reasoning approach in e-tourism: tour itinerary planning,” 14th International Workshop on Database and Expert Systems Applications, 2003. Proceedings., Prague, Czech Republic, 2003, pp. 818-822.

Gabovich, E. Ya, “Constant discrete programming problems on substitution sets”, vol. 12, issue 5, pp. 786-787+3, 2011.

Nakanowatari, Akihiro, “Face Recognition that is Robust Against Pose and Illumination Changes”, Panasonic Technical Journal, Panasonic Corporation, Jan. 15, 2009, vol. 54, No. 4, pp. 24-29.

(56) References Cited

OTHER PUBLICATIONS

"A great attraction for all ages", Review of Futuroscope, Chasseneuil-du-poitou, France, www.tripadvisor.com, 2008-2011, 5 pages.
L. Sherry, "NAS-wide simulation and passenger itinerary performance: Implications for NextGen benefits analysis," 2011 Integrated Communications, Navigation, and Surveillance Conference Proceedings, Herndon, VA, 2011, pp. L-7-1-L7-9 (Year: 2011).
Marquez Vazquez, J. M., Gonzalez-Abril, L., Velasco Morente, F., & Ortega Ramirez, J. A. (2012). Performance Improvement using adaptive learning itineraries. Computational Intelligence, 28(2), 234-60 (Year: 2012).
M. Molina and A. Stent, "Generating Descriptions that Summarize Geospatial and Temporal Data," 2009 21st IEEE International Conference on Tools with Artificial Intelligence, Newark, NJ, 2009, pp. 485-492 (Year: 2009).
KR 2020-7013912 Preliminary Rejection Aug. 14, 2020.
JP Office Action for Japanese Application No. 2020-119723 mailed Aug. 31, 2023.
1 KR Office Action for Korean Application No. 2023-7006801 mailed Nov. 15, 2023.

* cited by examiner

QUEUE MANAGEMENT SYSTEM AND METHOD

CROSS REFERENCE TO RELATED APPLICATIONS

This application is a continuation of U.S. patent application Ser. No. 16/417,287, entitled "QUEUE MANAGEMENT SYSTEM AND METHOD," filed May 20, 2019, which is a continuation of U.S. patent application Ser. No. 13/491,289 entitled "QUEUE MANAGEMENT SYSTEM AND METHOD," filed Jun. 7, 2012, now U.S. Pat. No. 10,304,276, which issued on May 28, 2019, each of which is hereby incorporated by reference herein in its entirety for all purposes.

FIELD OF DISCLOSURE

The present disclosure relates generally to the field of amusement parks. More specifically, embodiments of the present disclosure relate to methods and equipment utilized to control wait times in attraction queues by providing reservations.

BACKGROUND

Since the early twentieth century, amusement parks have substantially grown in popularity. In order to address this increasing demand, amusement parks have been expanding at a tremendous rate by adding attractions and space. The addition of attractions (e.g., rides, restaurants, shops, and shows) generally provides an amusement park with additional capacity to handle a larger number of guests. However, the additional attractions also typically provide potential guests with an incentive to visit the amusement park. Thus, while a particular amusement park may add additional capacity, the additional capacity does not always result in reduced wait times for attractions because there is often a corresponding increase in attendance. Further, due to operating efficiencies, it is often desirable to limit the availability of attractions during low attendance times. Thus, queuing for attractions is a perennial issue for amusement parks.

While guests have demanded bigger, better, and more elaborate attractions, they also require and expect a positive overall experience. Providing a positive overall experience for amusement park guests entails addressing certain issues related to queuing for attractions. Indeed, it is now recognized that park guests can be deterred from returning to a particular amusement park due to negative experiences with queue waiting times. Further, guests may be prevented from accessing amusement park businesses (e.g., shops) due to time spent waiting in queues. Indeed, in the past, guests have been forced to wait hours in line to experience some of the more popular attractions at an amusement park. Additionally, it is now recognized that park capacity does not always equal guest utilization of that capacity due to individual guest preferences for certain attractions over others. Accordingly, it is now recognized that it is desirable to improve amusement park queuing systems and methods.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
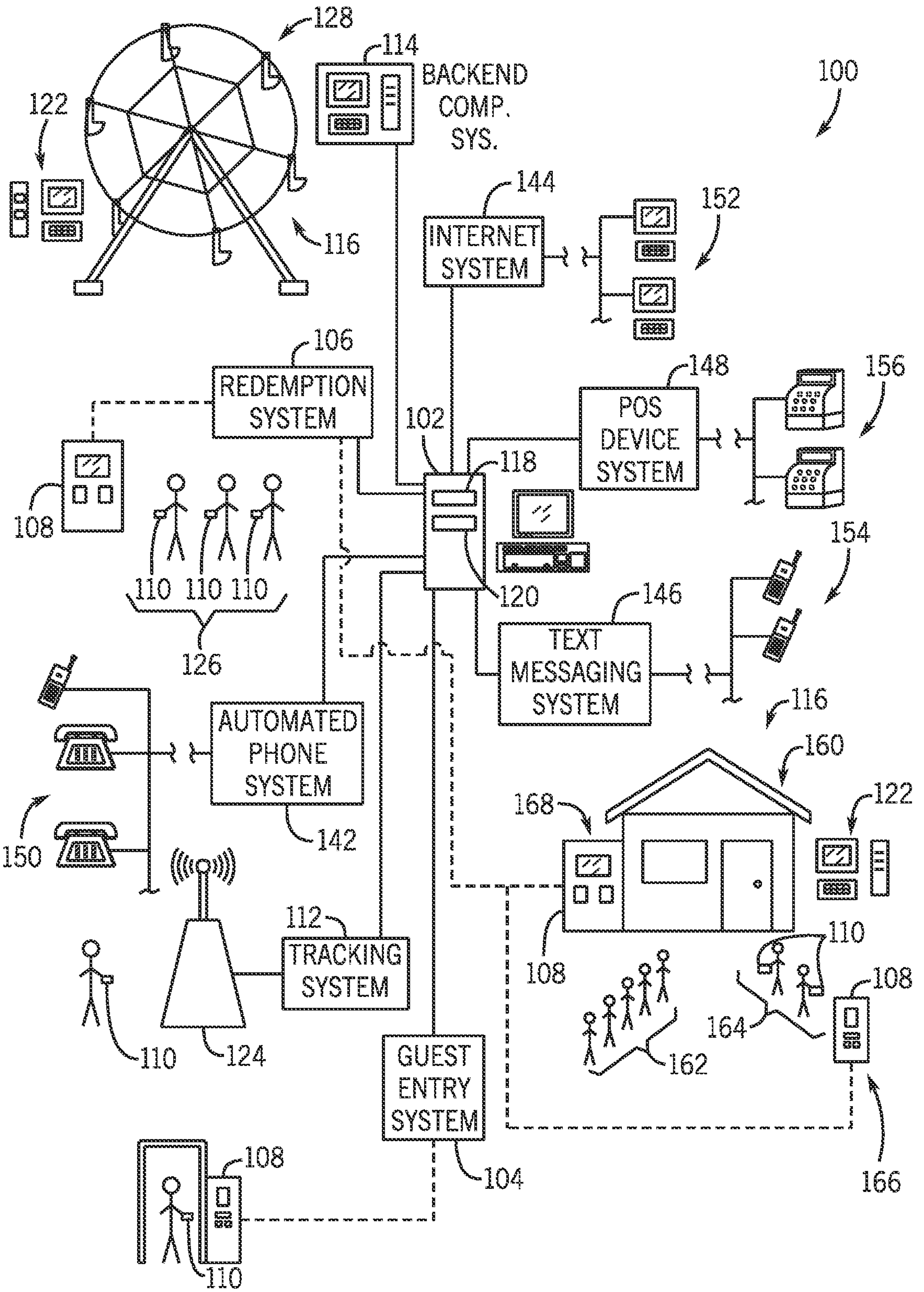
FIG. 1 is a schematic representation of an amusement park including a reservation system in accordance with present techniques.

The present disclosure relates generally to methods and systems for controlling wait times in amusement park attraction queues by dynamically managing reservations for amusement park attractions including shows, restaurants, rides, shops, and so forth. Present embodiments include a system with an electronic data server and respective applications capable of communicating and monitoring metrics or characteristics related to reservations for attractions in an amusement park, and controlling queue flow characteristics. The system may include a verification system, a tracking system, a redemption system, mobile devices, and backend computers and devices. The system may be configured to receive one or more reservation requests at a time and assign a general or specific time frame for the reservation based on information provided by a user and/or based on other data (e.g., data regarding operation of a related attraction or data related to detected locations of guests holding reservations). Further, present embodiments are configured to access or modify one or more existing reservations and/or adjust queue characteristics (e.g., access ratios) based on changes in the reservation requests, changes in guest scheduling, guest location, data regarding an attraction or attractions related to a reservation, entitlement levels (e.g., based on tiered payment options for various levels of access) and so forth. With regard to entitlement levels, tiered approaches to pricing for various features or components may be available, including micropayments for certain services or tasks. For example, a guest may provide a micropayment to receive periodic updates regarding short queues in certain areas of the park.

The system may enable guests to utilize mobile or wireless technology to wait in a virtual queue for a particular attraction or attractions while experiencing other attractions or relaxing in other areas in or away from the amusement park. Indeed, present embodiments include a system configured to communicate with one or more attractions related to a reservation request or an existing reservation to dynamically adjust and optimize guest waiting experiences in real-time, and communicate updates to guests (e.g., via mobile or wireless technology). Present embodiments may facilitate communication with guests via portable communication devices, such as cellular telephones, pagers, and other wireless devices. Such devices may be referred to as mobile devices. Communications referenced herein between a system and guests include email, text, video, web-based, and audio communications from the system to the mobile devices or the like. The location of guests within the amusement park may also be obtained by monitoring such mobile devices or other means (e.g. facial recognition systems, ticket scanning, etc.). In some embodiments, communication with guests may be achieved via publicly accessible displays. For example, kiosks with communication features (e.g., computers capable of accessing a network) may be positioned throughout the amusement park.

In accordance with present techniques, a reservation system is configured to provide an interface for a user or guest to make a reservation for access to one or more attractions of an amusement park during a visit. Reservations may be made for a group of guests or a single guest prior to arriving at the amusement park or while present in the amusement park. Indeed, functions of the system described herein may include communicating with a single guest or a group. Making a reservation for multiple guests, as a group, may be facilitated by enabling association of all of the corresponding tickets with a single guest's ticket. These reservations may be made prior to or during the guest's visit to the amusement park using a laptop computer, desktop computer, mobile device, or other access device. Such a reservation may be acquired via on-line resources, via direct access to a portal of the reservation system, via a telephone system, and so forth.

In accordance with the present disclosure, tickets may include various types or combinations of credentials that may be used to verify access rights to an attraction (e.g., an amusement park). The tickets (e.g., paper tickets, biometrics, or electronic tickets) may be utilized to verify access rights at a current time or future access rights. When tickets are not purchased together, present embodiments may associate the tickets as a group. This will allow any member of a group of guests to acquire reservations for the group. For example, if a group of several guests arrive at the amusement park and each separately purchases tickets, one of the group's guests can use present embodiments to make one or more reservations for the group. Present embodiments are capable of associating the reservation for the group with a single ticket, which becomes the "master ticket". When the reservation is redeemed, the master ticket associated with the reservation must be confirmed first and then the tickets of the remaining group members are confirmed. Several techniques and systems may be utilized to associate tickets with a master ticket. This may include scanning the tickets to confirm identification information, authenticity, and reservation information. During the confirmation process, each ticket may be associated with the remaining reservations in the system. Accordingly, subsequent reservations may not require that the master ticket be confirmed before a reservation can be used.

Further, reservations may be made prior to a guest visiting the amusement park without specifically designating a time frame for the reservation. For example, a reservation may be established for a particular date without designating an hourly time range for the reservation. However, in some embodiments, an initial slot of time may be defined based on a guest's predicted arrival time to the amusement park. For example, this predicted arrival time may be designated as the morning or the afternoon. In such embodiments, once the guest arrives, a specific time frame (e.g., 3:00 PM to 3:15 PM) may be assigned for the reservation depending on the guest's arrival time and the availability of reservation time slots for associated attractions. It should be noted that present embodiments may be utilized to make multiple reservations for one or more attractions. Present embodiments may also facilitate communication between the reservation system and guests to provide for dynamic updating of reservation times and to provide crowd control by encouraging guests to visit particular areas of the amusement park. Further, present embodiments may efficiently accommodate schedule changes of guests by facilitating reservation trading within the reservation system. For example, if a guest would prefer to change an assigned reservation, the guest may use the reservation system to acquire a new reservation at a more convenient time, returning the original reservation to available inventory or reassigning it, if applicable.

Referring now to FIG. 1, a system for managing theme park attraction queues is generally indicated by reference numeral 100. The queue management system 100 includes a data server system 102, a guest entry system 104 (e.g., a ticketing system or access validating system), a redemption system 106, data readers 108, portable identification features (PIFs) 110, a tracking system 112, a backend computer system 114, and at least one attraction 116. Certain components of the system 100 may be extensions or modules of the data server system 102, and other components may be separate features that communicate with the data server system 102. Indeed, the data server system 102 may include one or numerous computers with one or more processors 118 and memories 120 (e.g., a hard drive or other tangible, machine-readable medium that are non-transitory, which merely means that they are not signals). Indeed, in one embodiment, the data server system 102 includes one or more redundant servers to ensure reliability and to enable maintenance. The memory (or memories) 120 may store code or instructions that, when implemented by the processor (or processors) 118, cause the reservation system 100 to perform certain functions in accordance with present embodiments. Indeed, certain component systems (e.g., the guest entry system 104) of the system 100 may include code stored in memory 120 capable of being activated by a processor 118. It should be noted that the present disclosure may refer to a grouping of components of the system 100 or all of the components of the system 100 as the "reservation system 100" or the "system 100". Thus, actions indicated as being performed by the reservation system 100 or system 100 may include actions performed by a subset of the system 100. For example, the data server system 102 may coordinate with a data reader 108 of the guest entry system 104 to perform the action of determining whether a particular guest has checked in (e.g., passed through an entry or portal) to the amusement park. This action may be referred to as having been performed by the reservation system 100.

In the illustrated embodiment, the attraction 116 includes a monitoring and/or data maintenance system 122 that may be utilized to monitor and/or provide information regarding operation of the associated attraction 116. These monitoring and/or data maintenance systems 122 may be referred to as attraction systems 122 and may include one or more of a computer, a control system, and monitoring features (e.g., sensors and cameras). In some embodiments, the attraction systems 122 basically include ports or workstations for entering information into, retrieving data from, or otherwise communicating with the data server system 102. For example, the attraction systems 122 may enable employees of the amusement park to input data (e.g., wait times, attraction capacity, and downtime) regarding operation of the related attraction. In other embodiments, the attraction systems 122 are separate systems that are configured to operate independently and to communicate with the data server system 102. As an example, the attraction systems 122 may be capable of logging all activity (e.g., downtime, statistics regarding requested and redeemed reservations, availability, and quantity of traffic through the attraction) associated with reservations for the corresponding attractions 116 to facilitate data analysis by the data server system 102 and/or the backend computer systems 114. In one embodiment, the system 100 is capable of expansion to enable storage and processing of large amounts of data. Data obtained from the attraction systems 122 may be submitted for data analysis by the system 100, the results of which are used to assist with control of queuing characteristics and reservations, as will be discussed further below.

The PIFs 110 may include tickets. Specifically, for example, the PIFs 110 may include printed tickets, biometrics, and/or mobile devices. As an example, the PIFs 110 may include printed strips of material, facial recognition, finger scans, cellular telephones, microchips (e.g., a memory) or circuitry installed in cards or bracelets, pagers, or wireless devices that can be provided by the amusement park or owned by the guests. Indeed, a particular cellular telephone, which may be owned by a guest or obtained from the amusement park, may be associated with a guest pass. The term guest pass may be used to generally refer to the right of a guest to access certain attractions or the amusement park in general. For example, a guest pass does not necessarily have to be a tangible item. A guest can purchase a guest pass, which is then associated with identification information (e.g., a password, serial number, name, or numeric code) of the guest on the system 100 such that the identity of the guest can be confirmed and the rights of the guest can be ascertained. This association may be performed by a portable identification feature assignment system of the data server system 102. Thus, a guest pass can be associated with a PIF 110 that is assigned to a particular guest, and the PIF 110 can then be used to confirm rights of the guest via the system 100. Depending on this information, an amusement park employee or system can grant or deny a guest access to certain attractions 116 or rights to make reservations. In some embodiments, the PIFs 110 are capable of wireless detection and provide access to identification information associated with the PIFs 110. For example, the tracking system 112 may employ device monitors 124 to track PIFs 110 in the amusement park and identify the location of particular guests within a range of space. The system 100 also detects whether a guest has arrived in the amusement park by monitoring the guest entry system 104 and whether certain PIFs 110 associated with guests have been detected. This may include scanning a ticket, scanning barcode from the screen of a portable device, pinging a portable device, or the like, using the tracking system 112. Detection of entry of a guest into the amusement park may be confirmed at purchase of the guest pass and association with the PIF 110 by, for example, scanning the ticket or associating identification information for a mobile device with a guest pass.

As indicated above, a guest (or agent of the guest) may use present embodiments to obtain reservations to one or more attractions in order to avoid or limit wait time in attraction queues, such as a queue 126 for a particular ride 128. The system 100 may be designed to accommodate making, modifying, or accessing multiple reservations at one time without system slowdowns and with sufficient processing capability to ensure adding additional capacity does not affect operational speed. Reservations through the system 100 may be acquired by a guest remotely or from within the amusement park via an automated phone system 142, an Internet system 144 (e.g., a website or mobile site), a text messaging system 146, or a point-of-sale (POS) device system 148. The automated phone system 142 is accessible from and includes a network of phones 150. The Internet system 144 is in communication with the Internet 152 and, in some embodiments, includes two separate websites, wherein a first website accommodates guests wishing to make reservations and a second website provides access for service representatives to perform administrative tasks in addition to make and revise reservations. The text messaging system 146 is in communication with a network of wireless devices 154 (e.g., cellular telephones). The POS device system 148 includes and/or is in communication with POS devices 156.

The system 100 illustrated in FIG. 1 is capable of communicating with various different types of wireless or mobile devices, which may be owned by the guests or supplied by the amusement park. Indeed, the PIFs 110 may include communication features that enable all guests with reservations to receive messages and updates from the system 100. However, a mobile device may be used for communication with the system 100 without using the mobile device as a PIF 100. As an example of system communications, a text message may be sent from the text messaging system 146 to a mobile device functioning as a PIF 110 and assigned to a guest, wherein the text message indicates that a particular reservation time has been moved back due to technical difficulties with a particular attraction. The text messaging system 146 may be capable of sending a minimum of 20,000 automated text messages per minute with delay notifications, information notifications, advertisements, and the like. Further, various other components of the system 100 may be capable of communicating wirelessly with mobile devices or other wireless system components. For example, the data readers 108 and POS devices 156 and so forth may be wireless devices that are capable of communicating with the data server system 102 in a wireless manner. It should be noted that reference to mobile devices indicates items that a guest can readily transport, such as a cellular telephone, a pager, or the like.

When a guest is requesting a reservation right from offsite, as a component of the reservation process, the guest may be prompted by the system 100 (e.g., an interface module of the data server system 102) to provide the system 100 with an estimated arrival time (e.g., morning or afternoon) to an area, such as to the amusement park or to a particular attraction 116 (e.g., a segregated area of the amusement park). Such a request may be received through an interface system of the data server system 102 that is capable of receiving communications and input data from a guest (which includes current and potential patrons of the amusement park). Such communication may be provided via one or more of the automated phone system 142, the Internet system 144, the text messaging system 146, or the POS device system 148. A specific reservation will not be established until the guest actually arrives. Rather, a reservation allotment system of the data server system 102 sets aside a reservation slot based on the estimated arrival time and correlates the reservation slot to identification information for the guest. Providing an estimated arrival time may be required to establish a reservation right during the time period of the associated visit.

A detection system (e.g., the tracking system 112, the guest entry system 104, and/or the data readers 108) determines if the portable identification feature has arrived at a designated area (e.g., the amusement park). If a guest fails to arrive during a predicted time period (e.g., during morning hours), the system 100 may contact the guest and reschedule or cancel the associated reservation right based on feedback from the guest and/or other criteria. Similarly, once a guest is confirmed to be present in the amusement park, a reservation assignment system of the data server system 102 may define a specific reservation time and the guest may be informed of the specific reservation time (e.g., a 15 minute window to arrive at the attraction 116). For example, a guest that has an existing reservation right or that has requested a reservation may receive text messages or recorded audio messages from the system via one or more of the automated phone system 142, the Internet system 144, the text messaging system 146, or the POS device system 148. As a specific example, upon checking in at a kiosk including a POS device 156, the guest may be notified via the POS device system 148 that a specific time for a reservation has been established by printing a message and the reservation time on a receipt produced by the POS device 156. Similarly, communications from the system 100 may be provided via the automated phone system 142, the Internet system 144, or the text messaging system 146 to the guest via voice messages, text messages, or emails sent to a mobile device and/or the PIF 110 assigned to the guest (e.g., the guest's personal communication device or a device supplied by the amusement park). The specific time is narrower than the general time and will typically be defined within the general time but may be later.

Additionally, the system 100 in the illustrated embodiment facilitates communication from the guests to the system 100. For example, a user may communicate that a reservation is no longer desired or that there will be a delay in the guest's arrival to the amusement park or individual attraction 116 by submitting data to the system 100 via a mobile device, which may include the PIF 110. This type of information may be utilized by the system 100 to manage the reservations of the guest and other guests. Further, such information may be utilized by the system 100 to facilitate queue management. For example, cancelations may be utilized to adjust ratios of standby queues, express queues, very important person (VIP) queues, single rider queues, and reservation queues or a number of guests allowed access via a reservation entry. Indeed, the system 100 may communicate such data to attraction control systems (e.g., attraction systems 122) or amusement park employees charged with queue management. This may include provision of an access management system of the data sever system 102 or attraction system 122 capable of controlling an adjustable ratio variable that adjusts certain queue characteristics (e.g., number of standby line entries) relative to reservation entries to maintain a desired wait time, and capable of providing information regarding nearby attractions with low wait times (e.g., the nearest attraction with a lower wait time than the reservation queue or the lowest wait time).

Communications to the system 100 from guests may include periodic updates regarding respective locations of the PIFs 110 or updates entered by the guests via a data entry component of the each of the PIFs 110. As an example, the PIFs 110 may include global positioning systems (GPS), radio frequency identification (RFID) tags, or other detectable features that can be used to determine locations of the PIFs 110. Specifically, for example, if a PIF 110 is scanned as part of a purchase detected by a data reader 108, or detected by a device monitor 124 positioned in the amusement park, such information may be employed to determine a general location of the guest with which the system 100 has associated the PIF 110. Further, a guest may be able to submit requests or updates via a data entry feature (e.g., keyboard or other interface of the PIF 110). For example, the PIFs 110 may each include a keyboard or a basic input that enables a guest to respond affirmatively or negatively to questions issued by the system 100, such as questions regarding whether the guest intends to be present for a pending reservation. Other mobile devices not being employed as PIFs 110 may also be used to communicate with the system 100.

In addition to communications regarding reservations, communications between the system 100 and a guest may include other types of information or data, such as information related to crowd flow through the amusement park. For example, the system 100 may utilize location data from the PIFs 110 and other sources to assemble crowd flow data. This data may then be employed by the system 100 to encourage guest distribution throughout the amusement park, thus reducing crowds. For example, an electronic coupon, which may be limited to certain guests by identification information, for a nearby attraction may be issued by the system 100 via the PIFs 110 or a notice may be distributed indicating that short waits are available at certain attractions. The system 100 is capable of pushing information (e.g., coupons, advertisements, and wait times) out to guests via a web portal or the like. Specifically, for example, the system 100 may send out a text message to all park patrons that have a PIF 110 with particular identification information that will allow these park patrons to receive a discount at a shop or restaurant. Further, the system 100 may track usage of these discounts such that the system 100 is aware of time and location of use, which can be used for crowd control (e.g., submission of additional notifications based on location, item purchased, and so forth). Additionally, the system 100 may automatically adjust reservations based on location and availability. For example, a reservation may be adjusted because a patron is located too far away from the attraction (e.g., as determined by a purchase time of an item) to reach the associated attraction in time for the reservation or a guest's place in line may be adjusted because the guest was delayed in a restaurant due to slow service.

As with other types of information discussed above, the system 100 may communicate crowd flow information between attractions 116 and dynamically adjust queue characteristics (e.g., admission ratios between reservations and standby lines) to move toward optimization of guest waiting times for the attractions. For example, adjustments may be made to a ratio of guests allowed to enter a queued souvenir shop 160 from a standby line 162 (e.g., an area in which guests line up to enter an attraction without a reservation) relative to guests allowed to enter the souvenir shop 160 from a reservation line 164 (e.g., an area in which guests line up to enter an attraction based on a reservation) based on remaining reservations to enter the souvenir shop 160 and availability of access to attractions throughout the amusement park. It should be noted that guests entering the reservation line 164 may confirm a right to enter the reservation line or queue 164 by allowing a data reader 108 access to an associated PIF 110, and may confirm access to entering the souvenir shop 160 by allowing a different data reader 108 access to the associated PIF 110. Thus, the data reader 108 is utilized as an entry access confirmation feature. This dual confirmation may be utilized to monitor queue wait times. Similarly, a data reader 108 may be employed as an access confirmation feature by confirming that a guest has entered an attraction (e.g., entered a ride vehicle of an attraction).

The system 100 may also facilitate guest-to-guest communications and system-directed communications based on common characteristics of certain guests. Specifically, present embodiments may collect demographic data during a registration process or through an opting in process. A registration process may include a data entry requirement or any utilization of the system 100 by a guest that facilitates acquisition of the demographic data. For example, registration may include utilization of a cellular telephone by a guest in conjunction with the system 100, and the acquired demographic data may include an area code of the phone number associated with the cellular telephone. Direct guest-to-guest communication may be established between PIFs 110 assigned to the guests via the system when the PIFs 110 are capable of communication, or direct guest-to-guest communication may be established between communication devices provided by the guests or park and known by the system 100. Similarly, such communication may be established via enabling access to social media, which may also employ the PIFs 110 or known communication devices. Accordingly, guests with common characteristics based on their registration data or selected option can provide notices to one another. For example, guests from a similar geographic region may notify each other of activities that might be of common interest. Similarly, the system 100 may provide information regarding activities that may be of common interest based on demographic data. Among other things, the system 100 may facilitate posting status updates, notifying guests in a certain group of activities relevant to the group, or providing notice of certain conditions in the park.

In one embodiment of the present disclosure, a PIF 110 (e.g., an RFID transponder) is provided to each guest or group as they enter the amusement park. This may include the amusement park renting, loaning, or simply selling the PIFs 110 to guests. Each PIF 110 may be programmed and assigned in the system 100 to uniquely identify each guest or group. In some embodiments, providing each guest with a PIF 110 may include instructing the system to recognize and/or communicate with a device owned by a guest such that the device owned by the guest is employed and activated by the system 100 as a PIF 110. For example, the system 100 may be used to download an application onto a guest's cellular telephone such that the system 100 associates the guest's cellular telephone with an amusement park ticket and with the guest (or a group). In another embodiment, the system 100 may be programmed to detect the PIF 110 and recognize association with a valid guest pass. Further, as discussed above, different types of PIFs 110 may include paper or plastic tickets or bracelets with integral detection devices. For example, bracelets that include integral circuitry that stores a unique identifier in a memory and/or provides communication capabilities (e.g., the ability to communicate with a global positioning unit or other positional detection system). Automatic identification and data capture (AIDC) devices such as RFID tags may be used, for example. Other features of PIFs 110 usable with present embodiments may include barcodes, magnetic strips, pin numbers, cellular telephone identifiers, hotel room keys, credit cards, combinations thereof, and so forth. Any identification components of the PIFs 110 or combinations of such devices may have a reciprocal reader that communicates with the data readers 108 or other guest identifiers (e.g., POS devices 156) to track movement and/or spending of guests in and/or around the amusement park. This enables tracking of crowd flow. Furthermore, in some embodiments, the PIFs 110 include handheld electronic devices with display screens that enable communications regarding crowd flow to facilitate directing of guests to certain areas of the park.

In one embodiment, the system 100 is capable of controlling access and managing reservations to attractions 116 by facilitating communication between the data server system 102, which serves as a central queue control system, and the guest entry system 104. Indeed, coordination between the data server system 102 and the guest entry system 104 facilitates identification of the arrival and presence in the amusement park of guests with reservations, which assists with the management of reservations. Indeed, reservations may be changed or canceled depending on an algorithm that takes arrival time to the amusement park into account. Communication of the arrival and/or presence of a guest may be achieved by polling the guest entry system 104 with the data server system 102 at certain intervals (e.g., every 30 or 60 seconds) or at certain times, or by sending identification data for the associated PIF 110 from the guest entry system 104 to the data server system 102 each time a guest is admitted to the amusement park via the guest entry system 104. For example, the data reader 108 associated with a particular attraction 116 may communicate with the data server system 102 or directly with the guest entry system 104 to confirm that a guest has a valid park entry ticket. Specifically, for example, a guest may supply the PIF 110 assigned to the guest to the data reader 108 for a particular attraction 116. The data reader 108 may then acquire information from the PIF 110 and communicate with other system components to confirm that the PIF 110 is associated with a valid reservation and that the PIF 110 is known to be properly present in the amusement park. This may include confirming that the PIF 110 (e.g., a cellular telephone) has been identified as entering the amusement park (e.g., scanned during entry) via the guest entry system 104 and that the PIF 110 has been associated with a reservation for the particular attraction 116 or any attraction 116. In some embodiments, a guest must use the PIF 110 to communicate with a first data reader 166 in order to enter the queue 164 and then use the PIF 110 to communicate with a second data reader 168 to enter the attraction 116. This may facilitate monitoring of queue characteristics.

In one embodiment, the system 100 enables making a reservation for an individual or a group to access an attraction during a time range, modify the reservation, delay the reservation (e.g., delay the reservation at five minute intervals), transfer a reservation from one PIF 110 to another (e.g., from one group member to another), cancel a reservation, and provide reservation details and updates (e.g., in real-time). As indicated above, the system 100 includes numerous access or interface points that are capable of interfacing with a commerce management system (e.g., a module of the data server system 102 or a separate system in communication with or accessible through the data server system 102) for the amusement park. Indeed, users can access or interface with the system 100 remotely or from the amusement park property via the automated phone system 142, the Internet system 144, the text messaging system 146, or the POS device system 148. In some embodiments, accessing and manipulating reservations may be achieved using the PIF 110, which may be used to communicate with the data server system 102. Indeed, a guest may request that a reservation be moved back (e.g., moved back thirty minutes) or canceled by sending a text message from the PIF 110 or a system-recognized communication device to the data server system 102 because the guest took more time than expected having a meal. All interface points may be assigned the same capabilities depending on available security. For example, if it is determined that there is a risk of losing financial data during a transaction because of limited security from the interface point, access from such an interface point may be limited. Further, access to the system 100 to acquire reservations may be limited depending on the purchase of access rights. For example, a guest may have to purchase a reservation ability to successfully make reservations via the system 100. However, the purchase price of the reservation ability may be set to zero or a purchasing step may be bypassed. When the purchasing step is bypassed, the acquiring of reservations will seamlessly operate such that no indication of a required payment is provided. It should be noted that, in order to access the system 100 and make a reservation that requires access to a particular area or attraction (e.g., amusement park) as a precursor, a user can be required to have already purchased a ticket for the attraction or group of attractions. Indeed, access to making reservations within the system 100 or access to the system 100 itself may be limited to users that own a corresponding ticket or to those with special access (e.g., theme park employees).

Figure 2:
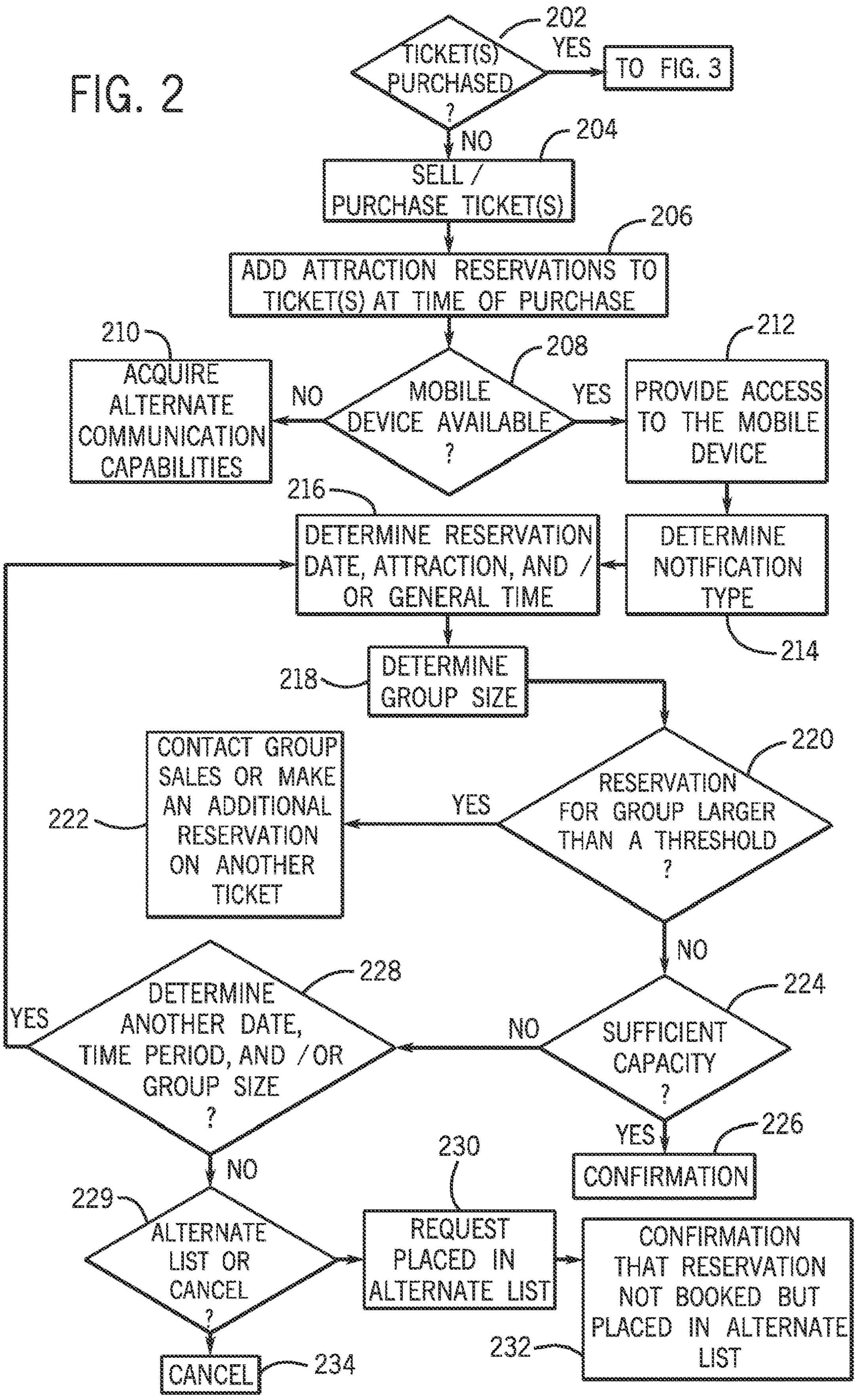
FIG. 2 is a process diagram of a method in accordance with present techniques.
Figure 3:
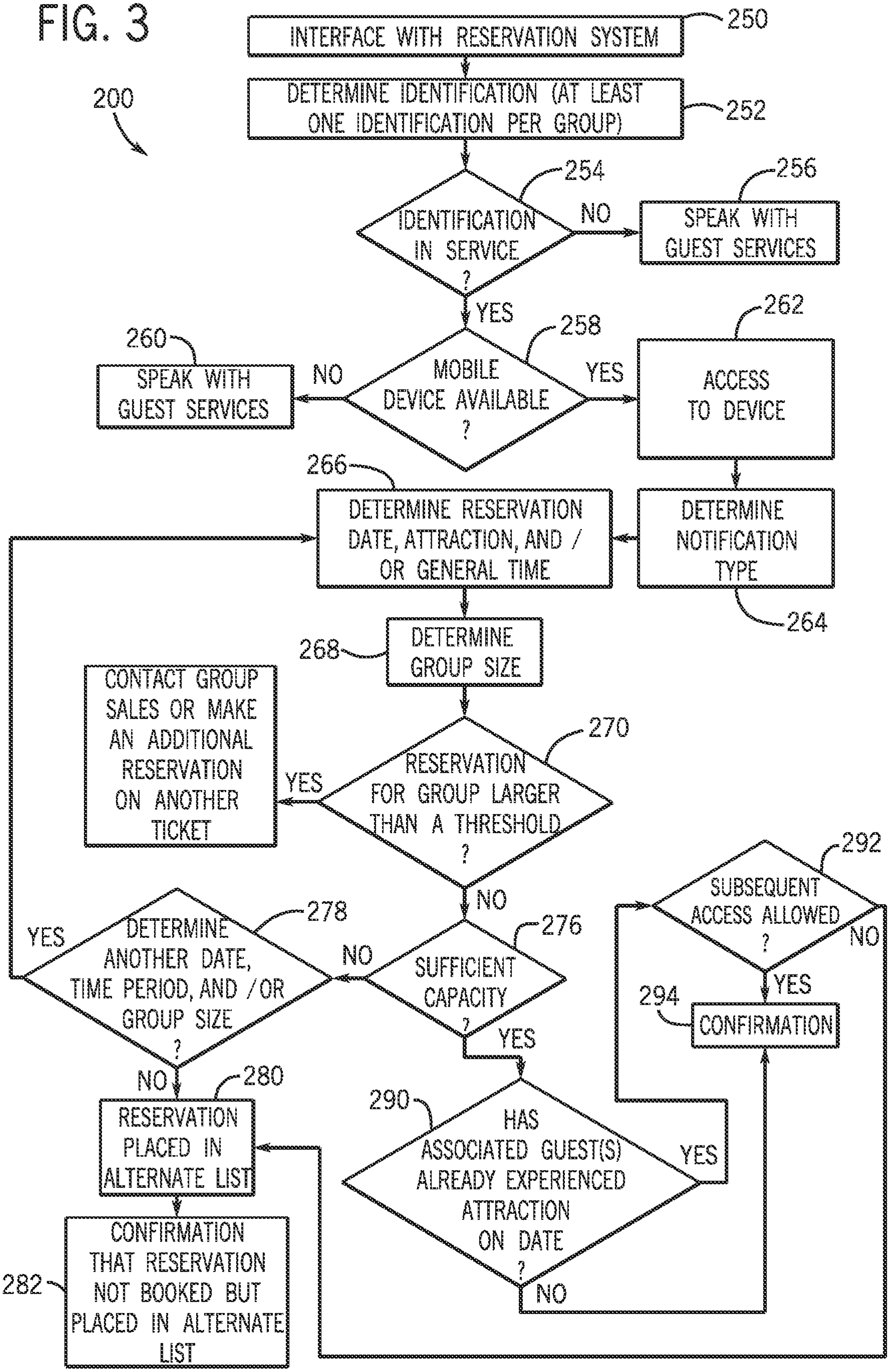
FIG. 3 is a process diagram of a method in accordance with present techniques.

FIGS. 2 and 3 include process flow diagrams for a procedure in accordance with present embodiments. The process is generally indicated by reference numeral 200 and includes various blocks that represent actions or steps of the process 200. The process 200 may be controlled or facilitated by a system, such as the data server system 102 and/or other components of the system 100, in accordance with present embodiments. Indeed, in one embodiment, the data server system 102 includes the processor 118 and the memory 120, wherein the memory 120 stores instructions implemented by the processor 118 to receive inputs of data, manipulate the associated data to transform the inputs into assembled information, and provide outputs corresponding to process steps or actions disclosed herein. Components of the process 200 may be performed by the data reader 108, which may maintain its own data processing capabilities, or other components of the system 100. Further, in different embodiments, certain actions or steps may be performed in a different order.

As illustrated in FIG. 2, the process 200 begins with a determination of whether a ticket or multiple tickets have already been purchased, as represented by block 202. In this context, a ticket is a right to access the amusement park or an attraction 116 of the amusement park. In other contexts, the ticket may be associated with different access rights. As an example, acquiring a ticket may include having the identity of a guest associated with such a right in the system 100. Specifically, for example, a guest may be assigned and provided a guest identification number, and the system may store information in memory identifying that number with a right of access. If tickets have not been purchased, the process 200 facilitates purchasing of tickets, as represented by block 204. In accordance with present embodiments, this purchase of a ticket or tickets is coordinated via the POS device system 148 (e.g., a ticket booth), via the Internet system 144, or via the automated phone system 142. During purchase, an attraction reservation capability may be added to a purchased ticket or multiple purchased tickets, as represented by block 206. The attraction reservation capability may be automatically added in some embodiments as a free component of the ticket. In other embodiments, the attraction reservation capability may be a user-selected option, which may be free or may require an additional fee. The system 100 is capable of giving certain reservations priority over other reservations. Priority may be given to guests that pay extra, very important persons, or guests that perform special tasks.

Block 206 may also represent the actual addition of one or more attraction reservations at the time of purchasing the ticket or tickets, which may include establishing a procedure for communicating information about the reservation. Indeed, block 208 represents prompting a guest to indicate whether a mobile device is available. If the guest does not have access to such a device, the guest may be directed to acquire alternate communication capabilities (e.g., self-provided communication device or park-provided communication device), as represented by block 210. To facilitate this, the guest may be directed to communicate with guest services. Accordingly, guest services can arrange for provision of a mobile device to the guest for purposes of communicating information about reservations and potentially serving as a PIF 110. If the guest would prefer not to use such a mobile device, arrangements can be made for other types of notification and confirmation, such as via kiosks throughout the amusement park and paper tickets. Returning to the prompt provided in block 208, if the guest has a mobile phone, a mobile communication device assigned by the amusement park, or the like, the guest can indicate that such a mobile device is available. In this event, the guest may be further prompted to provide access to the mobile device via a phone number, email address, or the like, as represented by block 212. For example, a guest may provide a phone number that can be used by the system 100 for text or voice communications related to attraction reservations. Indeed, the guest may actually select desired types of notifications, as represented by block 214. This may include selecting whether audio and/or text notifications are sent. The system 100 may prompt the guest to indicate whether text messages are acceptable. If the guest prefers not to use text, automated voice messages may be used. Further, block 214 may represent allowing a guest to determine whether certain types of information are sent to the mobile device. For example, a guest may limit communications to communications that are related to established reservations such that the guest does not receive communications related to coupons, wait times at other areas of the park, and so forth. In some embodiments, certain types of information may be accessed, received, or controlled based on a pricing tier of purchased access rights. For example, a guest with an upper tier access right may receive or access exclusive information about events only available to those with such access rights. As another example, those with upper tier rights may be able to block certain communications (e.g., advertisements) that cannot otherwise be blocked.

Once the manner of communication between the system 100 and the guest has been established, the process 200 continues to establish details of a reservation. As represented by block 216, this may include selecting an attraction, a reservation date, and a general time for the reservation. In some embodiments, only one attraction and/or reservation date is available for reservation, and, thus, an attraction and/or date do not need to be selected. Present embodiments allow a user to make a reservation prior to entering the park to confirm access to a particular attraction. However, the specific time of the reservation may not be made until the guest actually enters the amusement park. Indeed, for example, the specific time of a reservation may not be made until after the ticket associated with the reservation is identified by the guest entry system 104.

In the illustrated embodiment, the guest is requested by the system 100 to provide a general time for a reservation, as illustrated by block 216, to assist with organization of reservations. As previously noted, the actual reservation time will not be established until certain criteria are met. For example, a specific time window (e.g., a 15 minute window of time) for the reservation may not be established until the guest is confirmed to be present in the amusement park and has confirmed that the reservation is still desired. The general time for the reservation may be indicated as morning, afternoon, or evening. In another embodiment, the general time for the reservation may be one of various windows of time (e.g., four hour windows of time) that can be selected by the guest. This indication of a general time may allow for flexibility within the reservation system 100. For example, if a guest indicates a general time for the reservation to be in the morning of a particular day, a determination may be made regarding whether a guest has actually arrived at the park by a certain time in the morning. If the guest has not arrived, the guest may be contacted via the mobile device, which may include a PIF 110, to determine whether an adjustment to or cancelation of the reservation should be made. Certain adjustments to or cancelations of reservations may be automatically made when a guest has not arrived within an indicated window of time, when a guest fails to respond via the mobile device, when a guest provides certain updates (e.g., "will be one hour late"), or the like. As a specific example, when a guest has not arrived by a time that corresponds to the time set as the general time for the reservation, the guest may be prompted to indicate whether the guest still plans on visiting the amusement park. If the guest still plans on visiting the amusement park, the reservation may be adjusted. If the guest is no longer planning to visit the amusement park, the reservation may be canceled. When a reservation is adjusted, other reservations may be moved as well. Further, if a reservation is canceled, other reservations may be moved around and those in an alternate list may be contacted to fill the available reservation slot.

The present system 100 allows for multiple reservations to be made at one time. In one embodiment, multiple reservations may be made and initially associated with a single ticket or with each of multiple tickets. Indeed, in addition to receiving the other information provided in block 216, block 218 represents receiving an indication of a number of guests for the requested reservation. By allowing multiple reservations to be associated with a single ticket, a single group member may make reservations for a group of guests. However, reservations of more than a certain number of guests (e.g., 10 guests) may require approval from amusement park personnel (e.g., a member of a group sales department). Accordingly, block 218 represents receiving an input regarding a number of guests for which the reservation is to be made, which may include indicating that the reservation is for a single guest. Next, as represented by block 220, a determination is made as to whether the reservation is for a group larger than a certain threshold. If the group exceeds the threshold, the guest may be directed to contact a group sales representative for the amusement park or the like, as represented by block 222. This may include automatically connecting the guest via phone or initiating an email to the appropriate contact.

If the group does not exceed the threshold designated for group reservations (e.g., the reservation is for a single guest), the process 200 continues to a determination of whether the attraction for which the reservation has been requested has sufficient capacity, as indicated by block 224. In one embodiment, this action may include communication between the data server system 102 and the attraction system 122. For example, as discussed above, each attraction 116 may include monitoring and/or status management features (e.g., attraction computers) that maintain information regarding reservation times, availability, downtime, and the like. In other embodiments, all of this information may be centrally located (e.g., stored on the data server system 102). If a determination is made that there is sufficient capacity for the requested reservation or reservations, confirmation of the reservation or reservations may be provided to the guest and the reservation is booked, as represented in block 226, and the reservation is booked in the data server system 102 and/or the management system or attraction system 122 for the particular attraction 116 for which the reservation was made. For example, confirmation may include a text message, email, printout, or audio message transmitted from the data server system 102 to the mobile device via the POS device system 148, Internet system 146, the phone system 142, or the text messaging system 146. In other embodiments, the confirmation may simply be provided via the device being employed to make the reservation.

If a determination is made that there is insufficient capacity to accommodate the requested reservation, the process may prompt the guest to select another date, a different time period, or a different attraction, as represented by block 228. In some embodiments, if the group size can be reduced or divided to enable reservations, the guest may be notified of options for dividing the group or reducing the size of the group to obtain available reservation slots. If the guest chooses to make changes to the requested reservations, the process returns to block 216. If the guest chooses not to revise the request, the guest is prompted to select whether placement in an alternate list (a queue for filling slots that become available) or cancelation of the reservation request is desired, as represented by block 229. The prompt in block 229 may make clear that not selecting placement in an alternate list results in cancelation. The requested reservation may be placed in an alternate list when that option is selected, as represented by block 230. Indeed, present embodiments include a waiting list function such that when reservations are not available, the guest can obtain a position in a waiting list for notification of potential reservation slots that become available. Once the guest or group is assigned a position in the alternate list, the guest may be notified that the reservation has not been booked but that the guest and/or group has been assigned a slot in the alternate list, as represented by block 232. If the guest chooses cancelation, the reservation request is simply canceled and the guest is notified, as represented by block 234. As with confirmation of reservations, as discussed above, notification may be achieved by submitting a text message or voice mail to the mobile device or by communicating via the device being employed to request reservations. Further, should an opening for a reservation become available, the guest or group may be notified of the opening via the mobile device or via other notification mechanisms. The guests may be requested to respond to such notification by indicating whether they can fill the slot or not. The guest may be able to respond via the PIF 110 assigned to the guest. If the guest indicates availability to take the open reservation slot, the wait list reservation may be moved into the open reservation slot.

Returning to block 202 of the process 200, if tickets have already been purchased, the process 200 may be directed to contacting the reservation system 100, as represented by block 250 in FIG. 3. Upon accessing the reservation system, the guest may be prompted to confirm identification of the guest or group, as represented by block 252. This may include entering a confirmation number, scanning a physical ticket, accessing an application on a mobile device, or the like. Next, as represented by block 254, a determination is made as to whether the identification information corresponds to a guest pass that is currently valid or in service. If the identification information does not correspond to a valid guest pass, the process directs the user to guest services, as represented by block 256. This may include automatically connecting the guest to amusement park personnel via phone or automatically generating an email directed to the amusement park personnel.

If the system 100 determines that the identification information corresponds to a valid guest pass, a determination may be made as to whether the guest has previously associated the guest pass with a mobile device. If a mobile device has not been associated with the guest, the process 200 continues to block 258, which represents determining whether such a device is available. Many of the following steps are essentially equivalent to steps indicated and described with respect to FIG. 2. Specifically, block 258 represents prompting a guest to indicate whether a mobile device is available. If the guest does not have access to such a mobile device, the guest may be directed to guest services, as represented by block 260. Accordingly, guest services can arrange for communications capabilities for the guest by, for example, provision of a mobile device to the guest for purposes of communicating information about reservations. If the guest would prefer not to use such a mobile device, arrangements can be made for notification via kiosks throughout the amusement park or the like.

Returning to the prompt provided in block 258, if the guest has a mobile phone, a mobile communication device assigned by the amusement park, or the like, the guest can indicate that such a mobile device is available. In this event, the guest may be further prompted to provide access to the mobile device and then provide such access via a phone number, email address, or the like, as represented by block 262. For example, a guest may provide a phone number that can be used by the system 100 for text or voice communications related to attraction reservations. Indeed, the guest may actually select types of notifications, as represented by block 264. This may include selecting whether audio and/or text notifications are sent. The system 100 may prompt the guest to indicate whether text messages are acceptable. If the guest prefers not to use text, automated voice messages may be used. Similarly, emails may be provided as an option. Further, block 264 may represent allowing a guest to determine whether certain types of information are sent to the mobile device. For example, a guest may limit communications to those related to reservations such that the guest does not receive communications related to coupons, wait times at other areas of the park, and so forth. It should be noted that, if a mobile device has already been identified at block 254, the process 200 may continue directly to block 264 or 266.

Once the manner of communication between the system 100 and the guest has been established, the process 200 continues to establishing details of a reservation. As represented by block 266, this may include selecting an attraction, a reservation date, and a general time for the reservation. In some embodiments, only one attraction is made available for reservation, and, thus, an attraction does not need to be selected. As noted above, present embodiments allow a user to make a reservation prior to entering the park to confirm access to a particular attraction. However, the specific time of the reservation may not be made by the system 100 or provided to the guest until the guest actually enters the amusement park. Indeed, for example, the specific time of a reservation may not be made until after the ticket associated with the reservation is identified by the guest entry system 104.

A general time (e.g., morning or afternoon) for a reservation may be requested by the system 100, as illustrated by block 266, to assist with organization of reservations. The general time for the reservation is indicated as morning, afternoon, or evening. In another embodiment, the general time for the reservation may be one of various windows of time that can be selected by the guest. This indication of a general time may allow for flexibility within the reservation system 100. If the guest has not arrived by a time corresponding to the indicated general time, the guest may be contacted via the mobile device or the like to determine whether an adjustment to or cancelation of the reservation should be made. Certain adjustments to or cancelations of reservations may be automatically made when a guest has not arrived within an indicated window of time, when a guest fails to respond via the mobile device, when a guest provides certain updates, or the like. When a reservation is adjusted, other reservations may be moved as well. Further, if a reservation is canceled, other reservations may be moved around and those in an alternate list may be contacted to fill the available reservation slot.

As when purchasing tickets, as illustrated in FIG. 2, the present system 100 allows for multiple reservations to be made with respect to tickets that have already been purchased. Indeed, in one embodiment, multiple reservations may be made and initially associated with a single ticket or with each of multiple tickets. By allowing multiple reservations to be associated with a single ticket, a single group member may make reservations for a group of guests. However, reservations of more than a certain number guests may require approval from amusement park personnel. Accordingly, block 268 represents inputting a number of guests for which the reservation is to be made, which may include indicating that the reservation is for a single guest. Next, as represented by block 270, a determination is made as to whether the reservation is for a group larger than a certain threshold. If the group exceeds the threshold, the guest may be directed to contact a group sales representative for the amusement park or the like, as illustrated by block 272. This may include automatically connecting the guest via phone or initiating an email to the appropriate contact.

If the group size is within the threshold, a determination is made with regard to capacity in the attraction, as represented by block 276. If a determination is made that there is insufficient capacity to accommodate the requested reservation, the process 200 includes prompting the guest to select another date, a different time period, or a different attraction, as represented by block 278. In some embodiments, if the group size can be reduced or divided to enable reservations, the guest may be notified of options for dividing the group or reducing the size of the group to obtain available reservation slots. If the guest chooses to make changes to the requested reservations, the process returns to block 266. If the guest chooses not to revise the request and chooses not to cancel the request, the requested reservation may be placed in an alternate list, as represented by block 280. Indeed, present embodiments include a waiting list function such that when reservations are not available, the guest can obtain a position in a waiting list for notification of potential reservation slots that become available. Once the guest or group is assigned a position in the alternate list, the guest may be notified that the reservation has not been booked by that the guest and/or group has been assigned a slot in the alternate list, as represented by block 282.

If a determination is made that there is sufficient capacity for the requested reservation or reservations, a determination is made regarding whether the guest or guests have already accessed the attraction within a time period (e.g., on the date of the requested reservation, within a morning time period, or the like), as indicated by block 290. If the guest has previously experienced the attraction with the designated time period, a determination is made in block 292 as to whether a threshold amount of access has been reached (e.g., whether the guest or group has experienced the attraction three times in the same day). Such a determination may be made by an access management feature (e.g., a system of the data server system 102 or the system 122). If there is no limit or the limit has not been reached for accessing the attraction, confirmation of the reservation or reservations may be provided to the guest or group, as represented in block 294, and the reservation is booked in the data server system 100 and/or the management system 122 for the particular attraction 116 for which the reservation was made. However, subsequent access to an attraction may be limited based on previous access. If there is a limit on a number of times guests can access the attraction within the time period and that limit has been reached, access to another reservation may be denied, and the guests may be placed in an alternate list, as indicated by block 280. For example, confirmation may include a text message or audio message transmitted from the data server system 102 to the mobile device via the Internet system 144, the phone system 142, the text system 146, or the POS device system 148.

Figure 4A:
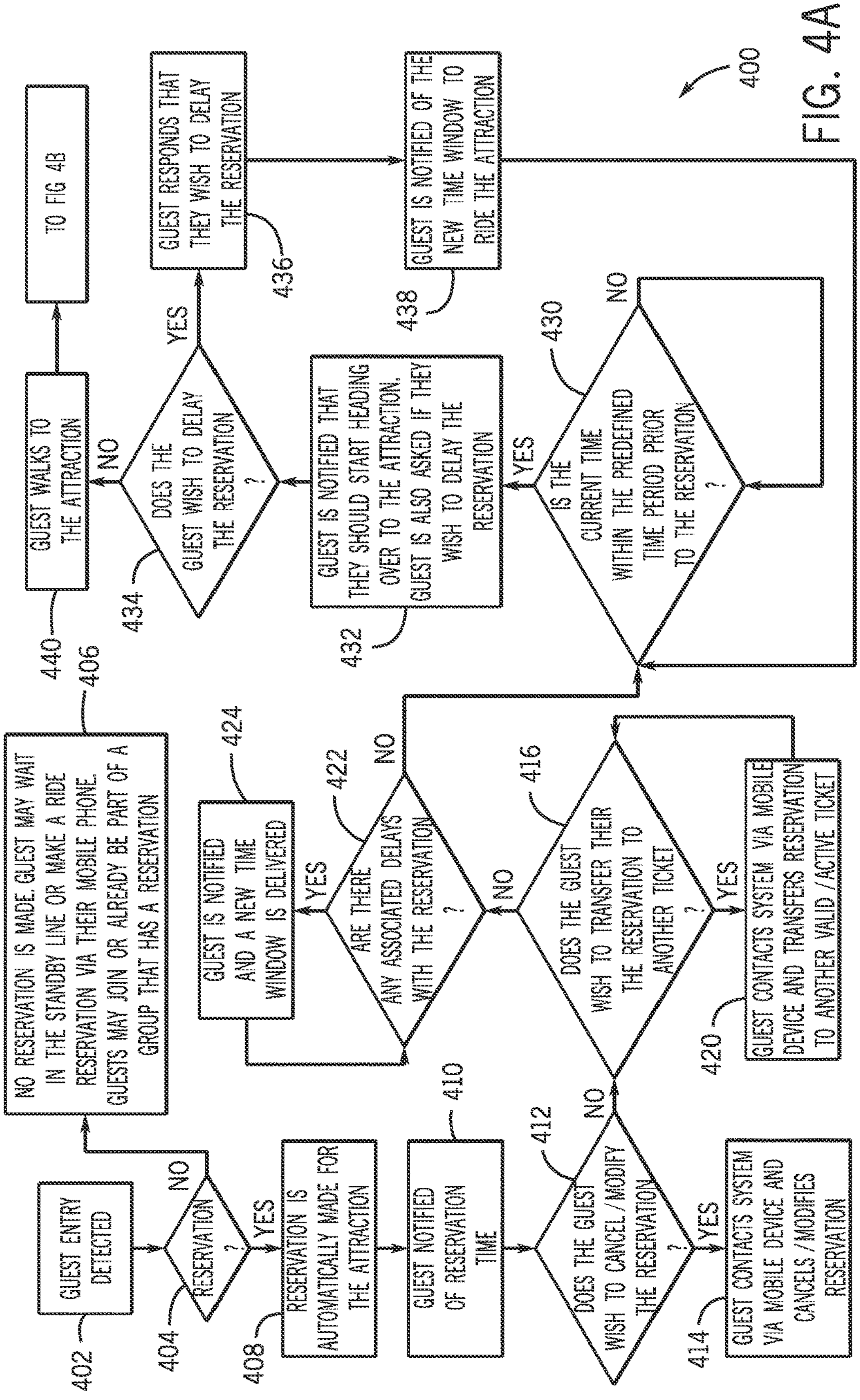
FIGS. 4A and 4B illustrate a process diagram of a method in accordance with present techniques.
Figure 4B:
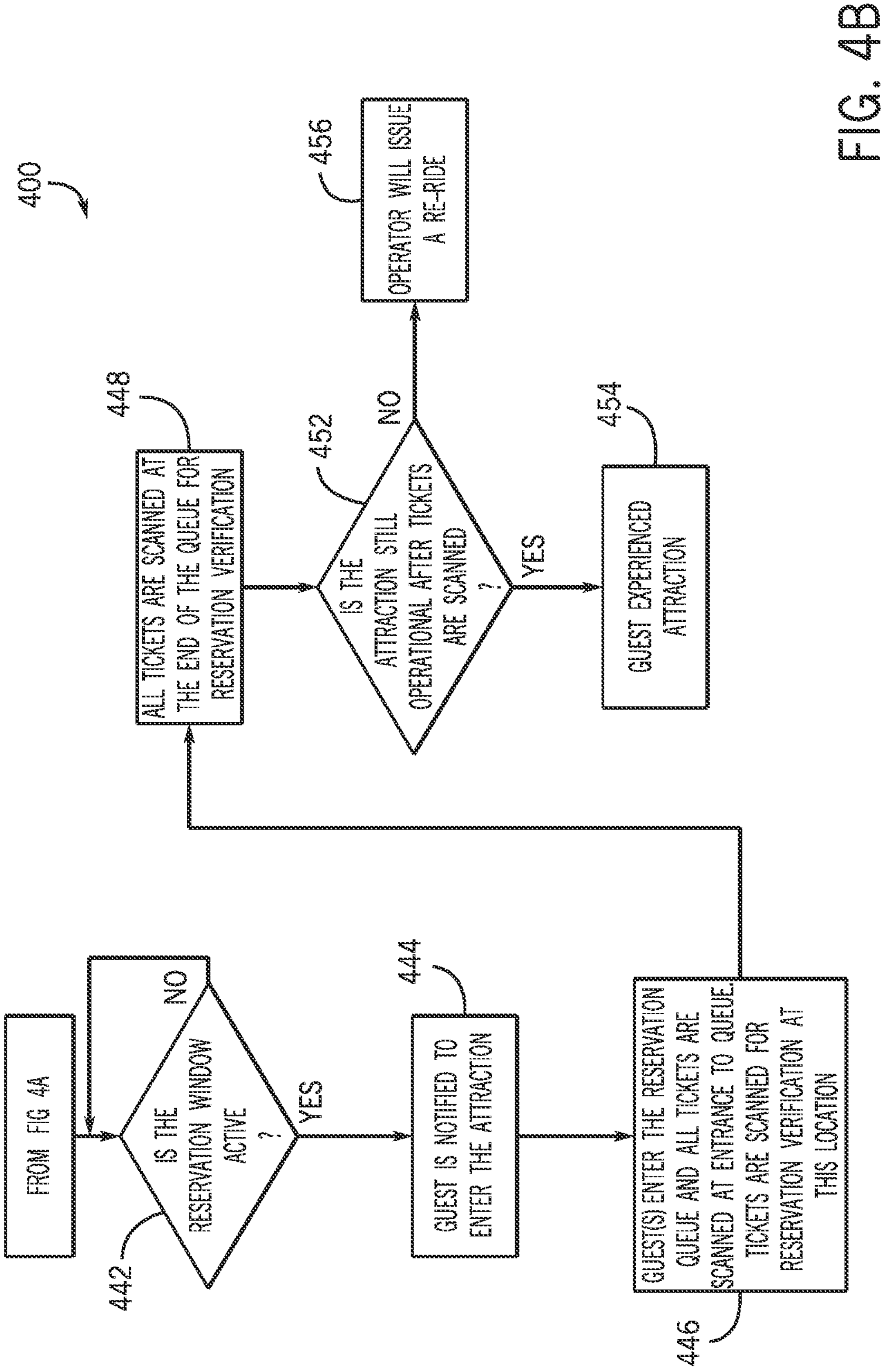

FIG. 4 is a process flow diagram of a method of employing the system 100 in accordance with present embodiments. The process is generally indicated by reference numeral 400 and includes various blocks that represent actions or steps of the process 400. The process 400 may be controlled or facilitated by a system, such as the data server system 102 and/or other components of the system 100, in accordance with present embodiments. Indeed, in one embodiment, the data server system 102 includes the processor 118 and the memory 120, wherein the memory 120 stores instructions implemented by the processor 118 to receive inputs and provide outputs corresponding to process steps or actions disclosed herein. These inputs and outputs may be respectively received from and directed to other components of the system 100 with respect to the data server system 102. Further, in different embodiments, certain actions or steps may be performed in a different order.

Inputs to the system 100 from a guest (before or during the guest's visit) may include a ticket identification, a mobile phone number, a reservation date, a reservation group size, estimated park entry time (e.g., morning or afternoon), associated ticket identifications (e.g., group ticket information), and so forth. Inputs to the system 100 from operators may include data indicative of ride capacity, downtime estimates, operational status of an attraction, re-ride status, queue ratio, messages, advertisements, statistics, and data requests. Automated inputs may include guest park entry time, guest queue entry time, guest queue exit time, standby time estimate, and valid ticket confirmation. Outputs from the system 100 to various systems (e.g., website, mobile site, text messaging system, phone, and POS devices) may include reservation capacity check results, general messaging, advertisements, available reservation dates, and reservation confirmations. Outputs from the system 100 to operators may include allowed ride queue entry messages and reservation approved messages. Outputs from the system 100 to guests may include status updates, reservation modification messages, reservation window messages, time limit warnings, active time window messages, guest-appreciation messages, confirmation of reservations, updates regarding reservations, general messaging, advertisements, and park entry messages. In different embodiments, certain inputs and outputs may be directed to different components.

The process 400 begins with confirming that a guest has appropriate access rights and allowing the guest to enter the amusement park when the access rights are confirmed, as represented by block 402. This step may involve the use of the guest entry system 104. Access rights may be confirmed by determining that the guest has provided identification information (e.g., a bar code on a physical ticket or data stored on a mobile device) that corresponds to a valid right to access the amusement park. For example, this may include scanning a ticket provided by the guest and confirming that the information retrieved from the ticket has been stored in a central database as corresponding to a right of entry on the date of scanning. Indeed, such information may be stored on the central database 102 and issued to the guest electronically or on a physical ticket item at the time of purchase.

After the identification information is confirmed, a determination is made with regard to whether the identification information is associated with an attraction reservation, as represented by block 404. If no reservation has been associated with the identification information, as represented by block 406, the guest may use standby lines to access attractions, join a group that has group reservations, or acquire a reservation. For example, if a guest did not establish reservations prior to arriving at the amusement park, the guest may use the Internet system 144, phone system 142, text system 146, or the POS device system 148 to obtain reservation rights and/or make reservations. If one or more reservations are already associated with the identification information and certain criteria are met, the system 100 automatically establishes specific reservation times, as represented by block 408. Indeed, once the guest is identified as being present in the amusement park, as occurs at block 402, the general time associated with the established reservation is converted into a more specified time (e.g., a time window or general time at which the attraction can be accessed with the reservation) and the guest is provided with a notification (e.g., a voice message, text message, or email) of the reservations via the mobile device or the like, as represented in block 410. As a specific example, upon requesting a reservation, the guest may provide a broad window of time such as "during morning operation hours," "during afternoon operation hours," "during evening operation hours," "between 1:00 PM and 6:00 PM," "between 7:00 AM and Noon", and so forth. Upon confirming the guest's entry into the amusement park, upon confirming that the guest is present in a certain area, or upon the guest checking in, a specific time for the reservation may be assigned by the system 100, such as a window of time from 2:00 PM to 2:15 PM or approximately 3:00 PM. This may not automatically occur when certain criteria are not met. For example, if the guest does not arrive within the predefined time frame (e.g., morning or afternoon), the availability of the reservations may have changed. As another example, the attraction may be unavailable due to technical difficulties. If there are issues with the reservation, these may also be communicated to the guest in the same manner as confirmation of reservations would be communicated.

Once reservations are confirmed, the system 100 may prompt the guest to make available an option to cancel or modify the reservations, as represented by block 412. For example, immediately after notifying the guest of confirmed reservations, the system 100 may request that the guest indicate whether certain reservations should be canceled or modified. If the guest indicates that reservations should be modified or canceled, as represented by block 414, the guest may be directed to guest services or to a component of reservation system 100 that facilitates performing the component of the process 200 set forth in FIG. 3. If the guest does not wish to change any reservations, the reservations may be transferred to other identification information (e.g., identification information associated with a PIF 110 assigned to another guest). For example, a guest with a ticket associated with a particular reservation can transfer the reservation to the ticket of another guest. Indeed, the system 100 may prompt a user or receive a user request to transfer reservations, as illustrated by block 416. The guest may respond by using the mobile device, a kiosk, contacting guest services, or the like to transfer the reservation to the identification information for another access pass, as represented by block 420. Numerous reservations may be transferred at once or a series of transfers may be performed in a loop operation, as indicated by the arrow pointing from block 420 to block 416, until the desired transfers have been completed. It should be noted that the system 100 may allow guests to change or modify reservations within certain time windows (e.g., at least 30 minutes before the reservation time) or any time before the time slot of the existing reservation. This may include canceling an existing reservation and attempting to replace it with a time slot preferred by the guest, trading an existing reservation with another guest, canceling an existing reservation and being put in a virtual standby queue, or the like. When a guest is attempting to change an existing reservation, that guest may be given priority over guests without existing reservations for purposes of selection of other available time slots for a replacement reservation.

Once all transfers have been made, a determination may be made regarding associated delays or other issues with the reservations, as indicated by block 422. This may include periodically updating and continuously monitoring attraction information from monitoring systems (e.g., attraction systems 122) associated with the related attractions. If issues are identified that will cause changes in reservations, the guest may be notified via text message, voice message, email, or via a kiosk display of a new time window for the reservation, as represented by block 424. The notification may also include an indication of the nature of the delay or change. Further, any conflicting reservations may be automatically adjusted. For example, if the changed reservation time conflicts with an established reservation time, the established reservation time may be automatically changed or the guest may be prompted to define a desired result from a selection of available options.

If no issues are identified with respect to changes in reservations, the process 400 may continue to monitor whether a time period before the reservation has been reached, as represented in block 430. For example, block 430 could represent a determination as to whether the current time is 15 minutes or less prior to the reservation (e.g., a time window). If the current time is not 15 minutes or less prior to the reservation, the process 400 continues to monitor. If the current time is 15 minutes or less prior to the reservation, the guest is provided with a reminder that the reservation time is near, as represented by block 432. This may include a suggestion that the guest begin moving toward the attraction. It should be noted that the time period before which the guest is notified may vary depending on the location of the guest. For example, if the system 100 identifies that the guest is in a particular location from which it generally takes a certain amount of time to travel to the attraction for which the guest has a reservation, the time period associated with the reservation reminder notification may be based on this distance and corresponding travel time.

After receiving the reservation reminder notification, the system 100 may enable a guest to move the reservation back or postpone the reservation. For example, a guest may be prompted or allowed to request a delay in the reservation, as indicated by block 434. If the guest chooses to delay the reservation, the guest may notify the reservation system 100 via the mobile device or other access points to the reservation system 100, as represented by block 436. The reservation system 100 may respond to such a request with information regarding a new reservation at a later time, a selection of reservation times that are available at later times, or an indication that no later times are available. The system 100 may then enable the guest to respond by, for example, confirming or selecting a supplied later time or declining to change the existing reservation. If a new reservation is established, the system 100 provides confirmation of the revised reservation, as indicated by block 438, and the process continues to monitor the current time relative to the reservation, as indicated by block 430. It should also be noted that, at any time in the process, a guest might choose to cancel their reservation in addition to modifying it.

If the guest elects not to delay the reservation, the guest may begin walking to the attraction, as represented by block 440. As noted above, the reservation reminder may account for the distance that will be traveled by the guest by monitoring the location of the guest and providing a reminder a corresponding amount of time in advance of the reservation time. A determination may be made regarding when the reservation time becomes active, such as when the current time enters a time window for the reservation, as represented by block 442. This is continuously monitored in the illustrated embodiment. When the current time corresponds to the reservation (e.g., the current time is within the reservation window), the guest is notified that the reservation is active and that the guest should enter the attraction, as indicated by block 444. When the guest enters a queue associated with the attraction, the guest may be required to confirm that they have a reservation by providing appropriate identification information, as indicated by block 446. For example, the data reader 108 of the system 100 may be used to scan tickets or interface with a mobile device at the entrance to a short reservation queue or an entry point to confirm that the guest has a reservation.

When an initial confirmation of guest identification and reservation information (e.g., a ticket scan) is performed at the entrance to a queue, further verification may be required prior to actually entering the attraction (e.g., boarding a ride), as represented by block 448. This may facilitate monitoring of the queue length at the associated attraction. Future provision of reservations and access provided to standby queues may be adjusted based on this measurement to control the wait time in the reservation queue. For example, during steady operation, present embodiments may control the approximate time spent by guests in a reservation queue to be around 10 minutes. Indeed, the system 100 may instruct an operator to allow guests to exit a queue and board an attraction as designated intervals based on an algorithm accounting for queue characteristics. Confirming identification information (e.g., scanning a ticket and accessing associated reservation data) for a guest entering a ride may also facilitate monitoring and control of subsequent access to attractions. For example, this may be used to indicate that a guest has already accessed a particular attraction using a reservation. An indication may be stored on the system 100 and associated with the identification information such that subsequent requests for reservations can be controlled based on whether certain attractions have already been accessed by the guest. This may include scanning tickets and so forth after the guests exit an attraction.

The system 100 may employ an algorithm that takes into account that certain guests may have accessed an attraction just prior to the attraction experiencing technical difficulties and becoming inoperable. For example, block 452 represents determining whether a guest checked in to an attraction but did not get to experience the attraction due to technical difficulties or the like. If the attraction was functional, the guest is indicated as having experienced the attraction, as represented by block 454. If the attraction was not functional, the guest may be automatically assigned another reservation or an immediate access right upon correction of the technical difficulty or the like, as represented by block 456. An attraction may be considered nonfunctional when access to the attraction is prevented or when the attraction experience is interrupted.

Present embodiments will allow for reservation trading via a reservation trading system, which may be a component or module of the data server system 102. This functionality may be available when the system 100 is in use with multiple attractions. For example, a first guest may have a reservation to access a first ride at 1:00 PM. However, the first guest may be eating lunch and will not be able to reach the attraction in time for this reservation. The system may prompt the first guest a certain time (e.g., 15 minutes) prior to the reservation to determine whether the first guest plans to keep the reservation. The time of prompting may be based on a detected location of the guest relative to the attraction 116 for which the reservation has been established. Since the first guest is unable to reach the first attraction in time, the first guest may respond by indicating that the reservation is not going to be kept. The system 100 may then automatically look for a later reservation for the first guest. A second guest may have a reservation at 4:00 PM and may be currently located near the first attraction, as determined by the system 100. The system 100 may identify this second guest based on location and time of reservation, and send the second guest a message indicating that a trade is available for the reservation held by the first guest. If the second guest accepts the trade, the reservations may be transferred between the first and second guests by the system 100 and the guests respectively notified of their new reservations. This assists with maintaining full capacity while eliminating stresses on guests associated with making appointments on time.

Figure 5:
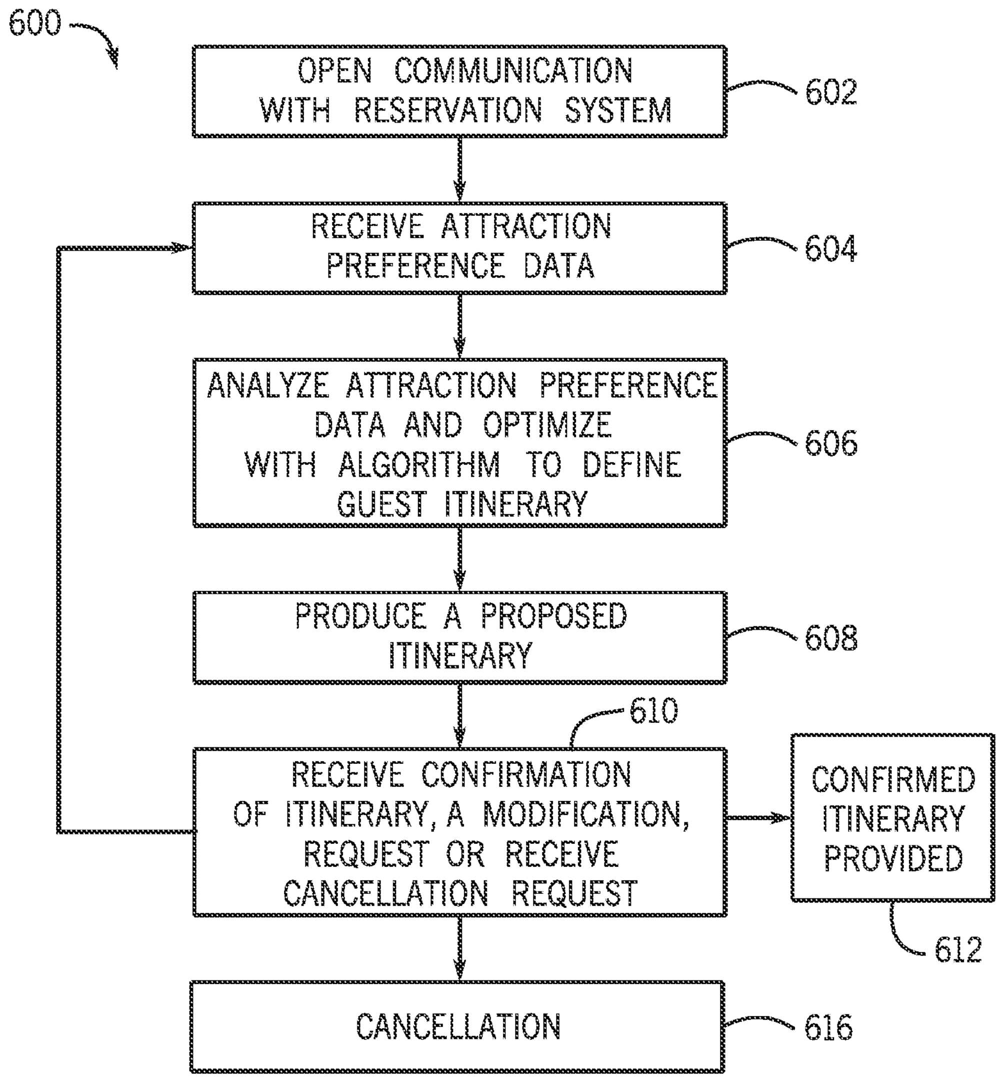
FIG. 5 is a process diagram of a method for facilitating guest scheduling of multiple reservations for attractions in accordance with present techniques.

Present embodiments include a process and system configured to provide each of multiple different guests or groups with multiple reservations or an itinerary based on input from the guests. For example, FIG. 5 is a process flow diagram that provides a general overview of a process 600 for facilitating guest scheduling of multiple reservations for attractions ranging from rides to restaurants in accordance with present embodiments. The process 600 of FIG. 5 generally illustrates establishing an itinerary that substantially optimizes the guests' time in the park and the park facilities. It should be noted that the process 600 is illustrated at a high level and may include the specific process features discussed above with respect to FIGS. 2-4. Further, the process 600 may be implemented using all or some features of the system 100 discussed above.

The process 600 begins with enabling guests to communicate with a reservation system and provide certain attraction preferences, as represented by block 602. This may include providing access to a reservation system for guests inside or outside of the park. For example, guests may provide a list of certain attractions the guests are interested in experiencing or types of attractions the guests are interested in experiencing. This may include providing specific attractions and preferred times for associated reservations along with a ranking indicating a level of interest in each attraction. However, the guests may choose to simply provide a list of attractions of interest and allow the system to propose times. Similarly, the guests may simply provide certain attraction types (e.g., rides appropriate for small children) and allow the system to propose an itinerary. Once the preferences are entered, the reservation system receives the associated data, as represented by block 604, and then processes the data to substantially optimize a schedule for each guest and optimize utilization of the park attractions, as represented by block 606. In response to the preferences provided by the guests, the reservation system may perform an optimization algorithm and output a proposed itinerary, as represented by block 608. In one embodiment, the guest may provide input before entering the park but will not receive a proposed itinerary until after entering the park.

The algorithm represented as being performed in block 606 may be stored on a memory and performed by a processor of the system (e.g., a processor 118 of data server system 102) to produce a proposed itinerary, as represented by block 608. The guest may then confirm the itinerary or request a different itinerary after reviewing the proposed itinerary, as represented by block 610. If confirmation is received by the system, the process provides a confirmed itinerary, as represented by block 612. If the guest elects to modify the itinerary, the guest may be prompted to indicate whether specific modifications are requested or cancelation is desired. If cancelation is desired, the process ends and cancelation is confirmed, as represented by block 616. If modifications are desired, the process may return to block 604 and/or enable changes to the schedule. It should note be noted that the system may provide proposed modifications based on attraction availability and recognized limitations of the guest's preferred schedule based on optimization data at any point in the process 600.

The algorithm represented as being performed in block 606 may function to identify the location of the attractions listed as being of interest to the guests and determine a schedule based on a number of factors or optimization data, such as ease of transition between individual attractions of interest. For example, the system may propose an itinerary that includes reservations for the guests' preferred attractions in a series that allows the guests to move from attraction to attraction throughout the park without requiring the guests to backtrack. The itinerary may also include proposed reservations for attractions along the path based on gaps in the schedule. In addition to taking distances and locations of attractions into consideration, the algorithm may consider maximization of operational efficiency of the park, the reservations of others, levels of interest, mealtimes, overlapping schedules with other guests designated as being in a common group (e.g., social network), and so forth. For example, the optimization algorithm may propose an itinerary that limits travel between attractions but accommodates a lack of availability of reservations at a particular time for a highly desired attraction. The algorithm may also direct guests throughout the park to avoid predicted overcrowding in particular areas based on established reservations and historic park data. The algorithm may also take into consideration that a break would be required around a mealtime and propose reservations at a restaurant attraction or simply suggest nearby restaurants. The algorithm may also take certain practical matters into consideration. For example, the algorithm may adjust the itinerary to exclude certain high intensity attractions for a certain time period after meals. The algorithm may also attempt to maximize utilization of the park by proposing reservations or visits to attractions that are underutilized at certain times. In one embodiment, the algorithm considers rankings of levels of interest (e.g., high, medium, low) provided by guests regarding attractions and provides an itinerary that accounts for this. For example, the algorithm may arrange reservations for attractions of high interest to be spread throughout the day to keep interest up through the day or to all occur early in the day to make sure that all of the high interest attractions are experienced early.

Figure 6:
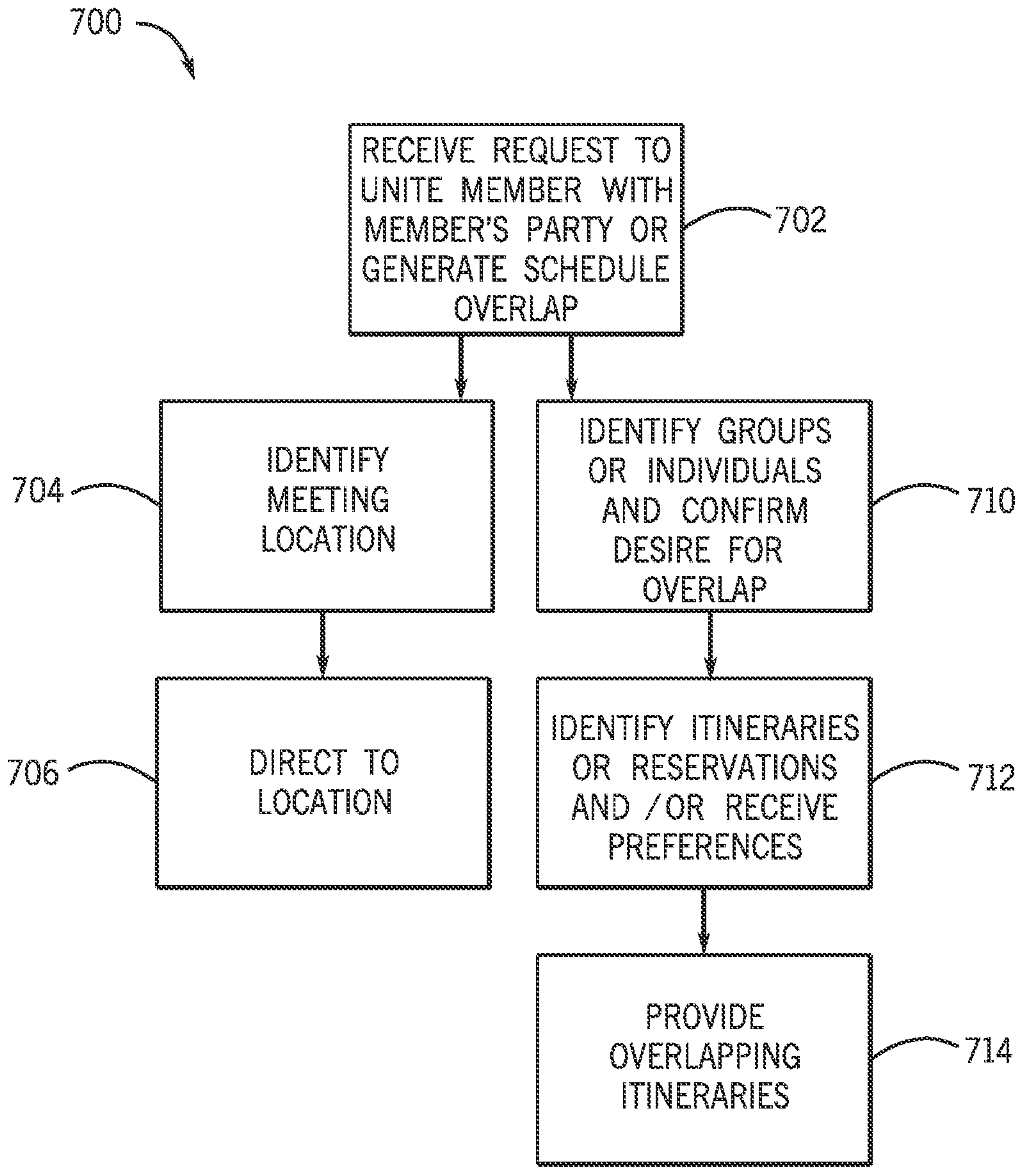
FIG. 6 is a process diagram of a method for coordinating guest schedules in accordance with present techniques.

Present embodiments may also facilitate group meetings within the park for parties that arrive separately, parties that separate once inside the park, or parties that desire a certain overlap in scheduling. For example, FIG. 6 illustrates a process 700 performed in accordance with present embodiments for coordinating guest schedules. The process begins with prompting the guest to indicate whether the guest would like to unite with a party of which the guest is already a member or whether the guest would like to have an itinerary that overlaps with that of another party. This initial procedure is represented by block 702 and may be performed using any of the access features discussed above with respect to the system 100, such as a cellular telephone in coordination with the system 100. Block 702 includes identifying the guest and the group.

If the guest wishes to meet with a group or party of which the guest is a member, the process may identify a meeting location, as represented by block 704, and direct the guest to the location and/or instruct the party to meet the guest at the location, as represented by block 706. This will generally occur when guests do not arrive to the park with their party or split off from their party during a visit. To facilitate regrouping of a party, present embodiments may utilize PIF positioning information to direct the guest to the desired party, use the established itinerary for the party to provide the meeting location, use guest-to-guest communications to communicate the meeting location, and/or use system-to-guest communications to communicate the meeting location. For example, the next attraction on the itinerary may be provided to the guest and the party may be informed via a text message that the guest will be joining the party for the reservation at the next attraction. Further, guest-to-guest communication may be facilitated between the party and the guest via the reservation system (e.g., text messaging or voice communications).

If the guest wishes to establish an overlap between the guest or the guest's group or party and at least one other group, the process 700 proceeds to block 710 in the illustrated embodiment. This may occur when two or more groups or individuals decide to spend time together at the park. For example, groups from a particular area may decide to establish overlapping schedules so that they can experience attractions of common interest together while experiencing other attractions in their separate groups. The groups or individuals may already have reservations (e.g., itineraries) or not. Block 710 generally represents identifying the groups or individuals and confirming a desire to have overlapping attraction experiences. Once this is established, a determination is made as to whether the one or more groups have existing itineraries or reservations, and preferences are provided where no itineraries or reservations are established, as represented in block 712. Existing itineraries and reservations are taken into consideration and preferences are otherwise provided. This may include providing attractions of common interest and desired overlap. An algorithm is then performed based on common interest of the guests based on explicit designations, comparison of preferences, comparison of existing itineraries, and/or optimization data to provide overlapping itineraries for the two or more individual guests or groups of guests, as represented by block 714.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A queue management system, comprising a first set of processors configured to:
- receive a set of guest selections of a set of one or more attractions of a plurality of attractions of an amusement park from a first guest;
- receive a signal indicating that the first guest is present at the amusement park;
- determine, in response to receiving the signal, operational status data for the set of one or more attractions indicated by the set of guest selections;
- generate, in response to receiving the operational status data, a first reservation comprising an attraction access time range for the first guest based at least on the set of guest selections and the operational status data, wherein the first reservation is associated with a first attraction of the set of one or more attractions; and
- based on the first guest not accessing the first attraction within the attraction access time range:
  - transfer the first reservation from the first guest to a second guest;
  - generate a second reservation for the second guest based at least on the first reservation; and
  - cause display of the second reservation on a display of a mobile device associated with the second guest.

2. The queue management system of claim 1, wherein the first set of processors is configured to receive the signal based on a second set of processors configured to output the signal in response to detection of a portable identification feature of the first guest of the amusement park, wherein the portable identification feature comprises an additional mobile device associated with the first guest, and wherein the first set of processors is configured to provide the first reservation to the first guest via presentation of the first reservation on a display screen of the additional mobile device.

3. The queue management system of claim 2, wherein the portable identification feature comprises a paper ticket, a plastic ticket, or an electronic ticket, and wherein the queue management system comprises a data reader configured to detect a unique identifier of the paper ticket, the plastic ticket, or the electronic ticket.

4. The queue management system of claim 2, wherein the portable identification feature comprises at least one biometric feature of the first guest, and wherein the at least one biometric feature comprises a facial scan or a finger scan.

5. The queue management system of claim 2, wherein the first set of processors is configured to:
- receive a request to register a group comprising at least one additional portable identification feature and the portable identification feature; and
- register the at least one additional portable identification feature and the portable identification feature as the group.

6. The queue management system of claim 5, wherein the portable identification feature and the at least one additional portable identification feature each comprise an electronic device, and wherein the first set of processors is configured to establish a group communication channel between at least the portable identification feature and the at least one additional portable identification feature.

7. The queue management system of claim 5, wherein the first set of processors is configured to:

receive a reservation request for the group to visit an attraction of the plurality of attractions; and reserve a timeslot for each guest of the group to visit the attraction.

8. The queue management system of claim 7, wherein, before reserving the timeslot for each guest of the group, the first set of processors is configured to:

determine whether a size of the group is greater than a predetermined threshold;

in response to determining that the size is not greater than the predetermined threshold, reserve the timeslot; and in response to determining that the size is greater than the predetermined threshold, request park personnel approval before reserving the timeslot.

9. The queue management system of claim 1, wherein the set of guest selections comprise:

a preferred reservation time for at least one attraction of the set of one or more attractions; or a ranked level of interest for each attraction of the set of one or more attractions.

10. The queue management system of claim 1, comprising at least one device monitor comprising a second set of processors disposed inside the amusement park, and wherein the at least one device monitor is configured to output a location signal indicative of a current location of the first guest within the amusement park in response to detecting a portable identification feature of the first guest inside the amusement park.

11. The queue management system of claim 10, wherein the first set of processors is configured to:

receive the location signal indicative of the current location of the first guest; and transfer the first reservation in response to determining that the current location of the first guest is greater than a threshold distance from a reserved attraction of the first reservation.

12. The queue management system of claim 1, wherein the attraction access time comprises a range of time for which the first guest is permitted to access the first attraction.

13. A server system, comprising:

a memory storing instructions; and one or more processors that, when executing the instructions, are configured to:

receive a set of guest selections of a set of one or more attractions of a plurality of attractions of an amusement park, wherein the set of one or more attractions is selected by a first guest;

receive a signal indicating that the first guest is present at the amusement park;

determine, in response to receiving the signal, operational status data for the set of one or more attractions indicated by the set of guest selections;

generate, in response to receiving the operational status data, a first reservation comprising an attraction access time range for the first guest based at least on the set of guest selections and the operational status data, wherein the first reservation is associated with a first attraction of the set of one or more attractions; and based on the first guest not accessing the first attraction within the attraction access time range:

transfer the first reservation from the first guest to a second guest;

generate a second reservation for the second guest based at least on the first reservation;

generate an attraction queue including at least the second reservation; and cause display of the attraction queue on a display of a mobile device associated with the second guest.

14. The server system of claim 13, wherein the one or more processors, when executing the instructions, are configured to receive the signal in response to detection of a portable identification feature of the first guest at the amusement park, and wherein the portable identification feature comprises a wearable device or a cellular telephone.

15. The server system of claim 13, wherein the first reservation or the second reservation comprises at least one reserved timeslot for at least one of the set of one or more attractions, and wherein the one or more processors, when executing the instructions, are configured to modify, cancel, or transfer the at least one reserved timeslot in response to a user request.

16. The server system of claim 13, wherein the first reservation or the second reservation comprises at least one reserved timeslot for at least one of the set of one or more attractions, and wherein the one or more processors, when executing the instructions, are configured to output a reminder of the at least one reserved timeslot a threshold amount of time before the at least one reserved timeslot.

17. The server system of claim 13, wherein the first reservation or the second reservation comprises at least one reserved timeslot for at least one of the set of one or more attractions, and wherein the one or more processors, when executing the instructions, are configured to delay the at least one reserved timeslot in response to receiving location information indicating that the first guest or the second guest is more than a threshold distance from a corresponding reserved attraction in a time period before the at least one reserved timeslot.

18. One or more non-transitory, computer-readable media having computer-readable instructions that, when executed by one or more processors of a data server system, cause the one or more processors to:

receive a set of guest selections of a set of one or more attractions of a plurality of attractions selected by a first guest of an amusement park, wherein the amusement park comprises the plurality of attractions;

receive a signal indicating that a portable identification feature of the first guest has been detected at the amusement park;

determine operational status data for the set of one or more attractions indicated by the first set of guest selections in response to receiving the signal;

generate a first reservation comprising an attraction access time range for the first guest based at least on the set of guest selections and the operational status data in response to receiving the operational status data, wherein the first reservation is associate with a first attraction of the set of one or more attractions; and based on the first guest not accessing the first attraction within the attraction access time range:

transfer the first reservation from the first guest to a second guest;

generate a second reservation for the second guest based at least on the first reservation; and cause display of the second reservation for the second guest on a display of a mobile device associated with the second guest.

19. The one or more non-transitory, computer-readable media of claim 18, wherein, the set of guest selections comprise:

a preferred reservation time for each attraction of the set of one or more attractions; and a ranked level of interest for each attraction of the set of one or more attractions.

20. The one or more non-transitory, computer-readable media of claim 18, wherein the computer-readable instructions cause the one or more processors to push wait time information for at least one attraction of the plurality of attractions to the portable identification feature in response to determining that the at least one attraction is associated with a wait time less than a threshold wait time.

* * * * *